United States Patent
Imamura

(10) Patent No.: US 9,319,493 B2
(45) Date of Patent: Apr. 19, 2016

(54) COMMUNICATION METHOD AND INFORMATION PROCESSING SYSTEM

(75) Inventor: Nobutaka Imamura, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 203 days.

(21) Appl. No.: 13/550,706

(22) Filed: Jul. 17, 2012

(65) Prior Publication Data

US 2013/0042307 A1 Feb. 14, 2013

(30) Foreign Application Priority Data

Aug. 11, 2011 (JP) .................... 2011-176416

(51) Int. Cl.
| | |
|---|---|
| G06F 7/04 | (2006.01) |
| G06F 15/16 | (2006.01) |
| G06F 17/30 | (2006.01) |
| H04L 29/06 | (2006.01) |
| H04L 29/00 | (2006.01) |
| H04L 29/08 | (2006.01) |
| G06F 15/173 | (2006.01) |

(52) U.S. Cl.
CPC .......... *H04L 69/28* (2013.01); *G06F 15/17306* (2013.01); *H04L 29/00* (2013.01); *H04L 67/10* (2013.01); *H04L 67/325* (2013.01)

(58) Field of Classification Search
CPC ..... H04L 67/10; H04L 67/325; H04L 12/433; H04L 12/417; H04L 67/1055; H04L 47/30; H04L 47/39; H04L 47/527; H04L 69/28; H04L 29/00; H04W 72/1284; G06F 15/17306
USPC ........... 370/395.53, 909, 450; 726/4; 709/251
See application file for complete search history.

(56) References Cited

U.S. PATENT DOCUMENTS

| | | | |
|---|---|---|---|
| 5,235,592 A | 8/1993 | Cheng et al. | |
| 5,235,593 A * | 8/1993 | Grow et al. | 370/452 |
| 5,280,582 A * | 1/1994 | Yang et al. | 709/225 |
| 6,320,871 B1 | 11/2001 | Mizuguchi et al. | |
| 2004/0001493 A1 * | 1/2004 | Cloonan et al. | 370/395.42 |
| 2005/0157745 A1 | 7/2005 | Fujii et al. | |
| 2008/0159315 A1 * | 7/2008 | Chrysos | 370/403 |

FOREIGN PATENT DOCUMENTS

| | | |
|---|---|---|
| JP | 4-70235 | 3/1992 |
| JP | 7-93636 | 10/1995 |
| JP | 9-252312 | 9/1997 |

(Continued)

*Primary Examiner* — Jeffrey D Popham
*Assistant Examiner* — Forrest Carey
(74) *Attorney, Agent, or Firm* — Fujitsu Patent Center

(57) ABSTRACT

A communication method in an information processing system including a group of first information processing apparatuses that transmit data and a group of second information processing apparatuses that receive the data is disclosed. The communication method includes storing data subject to being transmitted to one of the second information processing apparatuses in a data storage by associating the data with identifier information of the second information processing apparatus, and performing transmission processing to transmit the stored data to the second information processing apparatus in response to reception of a first token generated by the second information processing apparatus serving as a generating source of the first token, the first tokens indicating a transmission right to transmit the data to the second information processing apparatus and being transferred between the group of the first information processing apparatuses and between the group of the second information processing apparatuses.

14 Claims, 18 Drawing Sheets

(56) References Cited

FOREIGN PATENT DOCUMENTS

| JP | 11-163910 | 6/1999 |
| JP | 2000-332803 | 11/2000 |
| JP | 2007-235993 | 9/2007 |

* cited by examiner

FIG.10

| ID |
| --- |
| TARGET NODE |
| MAXIMUM ALLOWABLE TRANSFER LENGTH |
| TOTAL TRANSFER AMOUNT |
| REQUIRED CIRCULATION TIME HISTORY |
| REQUEST TOKEN LIST |
| BUFFER SHORTAGE LEVEL PER NODE |
| OTHER NODE ADDRESSED DATA AMOUNT PER NODE |
| MAXIMUM ALLOWABLE LATENCY SHORTAGE LEVEL PER NODE |

COMMUNICATION METHOD AND INFORMATION PROCESSING SYSTEM

CROSS-REFERENCE TO RELATED APPLICATION

This patent application is based upon and claims the benefit of priority of Japanese Patent Application No. 2011-176416 filed on Aug. 11, 2011, the entire contents of which are incorporated herein by reference.

FIELD

The embodiments discussed herein are related to a communication method and an information processing system.

BACKGROUND

A computer system such as a cluster computing system includes a number of computers (hereinafter called "nodes") that simultaneously perform parallel processing. In such a computer system, collision in communications between nodes or congestion in communications may become bottlenecks.

In the related art technologies, a communication pattern is designed for application programs (hereinafter called "application") executed by the nodes so as not to allow the collision to occur in communications between the nodes. Such a communication pattern is set in the applications, and each of the nodes performs communication according to the communication pattern set in the applications, which may prevent the congestion of the communications.

However, it maybe difficult to design an optimal communication pattern for those applications that change a communication partner node based on data input according to progress of the processing. This is because dynamic change of the communication partners may cause difficulty in predicting the communication pattern.

With respect to such applications, no specific actions have been taken in general in the hope of likelihood of collision occurrence being low owing to the randomness of the communication partners. Moreover, even if the collision did occur, it is generally considered that the throughput may be controlled by the bandwidth control and flow control of TCP/IP, or a frame collision avoidance technology for a local area network (LAN).

However, in the applications that handle a large amount of messaging communications with random communication partners, there is a likelihood that a certain amount of communications may temporarily converge on some of nodes in viewing the entire system. Accordingly, the likelihood of collision occurrence may not necessarily be low.

Further, the bandwidth control and flow control of TCP/IP may require longer time for exhibiting their effectiveness. In the frame collision avoidance technology for the LAN, packets may be lost at a LAN switch, or overhead may occur due to protocol stacks in the nodes and/or due to switching the control by the LAN switch.

As a result, communication congestion occurs in part of the network, which inhibits the potential performance that the entire system may otherwise exert.

RELATED ART DOCUMENT

Patent Document

Patent Document 1: Japanese Examined Patent Application Publication No. 7-93636

Patent Document 2: Japanese Patent Application Laid-Open Publication No. 04-070235
Patent Document 3: Japanese Patent Application Laid-Open Publication No. 2000-332803
Patent Document 4: Japanese Patent Application Laid-Open Publication No. 9-252312

SUMMARY

According to an aspect of an embodiment, there is provided a communication method in an information processing system, which includes a group of first information processing apparatuses that transmit data and a group of second information processing apparatuses that receive the data. The communication method includes storing the data subject to being transmitted to one of the second information processing apparatuses in a data storage by associating the data with identifier information of the one of the second information processing apparatuses; and performing transmission processing to transmit the data stored in association with the identifier information of the one of the second information processing apparatuses in the data storage to the one of the second information processing apparatuses in response to reception of a first token generated by the one of the second information processing apparatuses that serves as a generating source of the first token, the first token indicating a transmission right to transmit the data to the one of the second information processing apparatuses and being transferred between the group of the first information processing apparatuses and between the group of the second information processing apparatuses.

The object and advantages of the invention will be realized and attained by means of the elements and combinations particularly pointed out in the appended claims.

It is to be understood that both the foregoing general description and the following detailed description are exemplary and explanatory and are not restrictive of the invention as claimed.

Additional objects and advantages of the embodiments will be set forth in part in the description which follows, and in part will be obvious from the description, or may be learned by practice of the invention.

BRIEF DESCRIPTION OF THE DRAWINGS

FIG. 10 is a diagram illustrating a configuration example of a transmission token;

DESCRIPTION OF EMBODIMENTS

According to an aspect of an embodiment, there are provided a communication method and an information processing system that may be capable of reducing expected congestion in communications.

Figure 1:
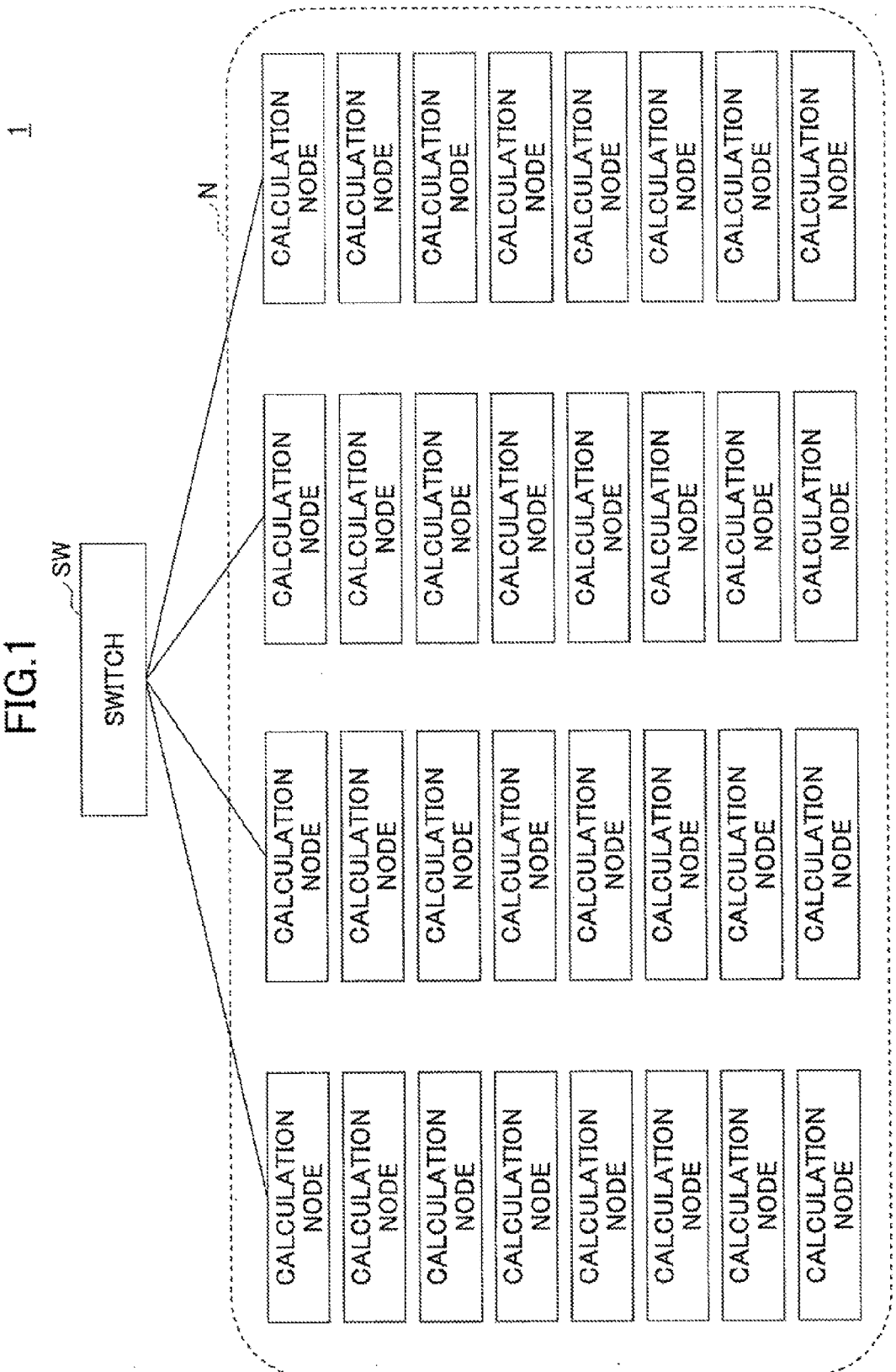
FIG. 1 is a diagram illustrating a configuration example of an information processing system according to an embodiment.

Preferred embodiments are described below with reference to the accompanying drawings. FIG. 1 is a diagram illustrating a configuration example of an information processing system according to an embodiment.

An information processing system 1 is a computer system and may also be referred to as a cluster system. In FIG. 1, the information processing system 1 includes a number of computers (32 computers in FIG. 1) connected via a communications network, such as a local area network (LAN), and a switch SW. Each of such computers are hereinafter called "a calculation node". FIG. 1 illustrates an example of the information processing system in which the calculation nodes are connected via a LAN switch in a star-like configuration; however, the information processing system according to the embodiment is not limited to such a specific network topology. Moreover, communications between the calculation nodes may be wireless communications.

The calculation nodes may have installed a common application program and information processing may be performed on input data of one of the calculation nodes N in parallel with those of other calculation nodes (herein after called "other nodes") N. In such parallel information processing, each of the calculation nodes N mutually communicate with the other calculation nodes N.

An example of information processing executed by the calculation nodes N may be a co-occurrence frequency analysis. The co-occurrence frequency analysis, for example, analyzes co-occurring word combinations and the frequency of such word combinations within a predetermined unit of certain document data (e.g., within one sentence or one page). Different document data are supplied to the calculation nodes N as input data. Each of the calculation nodes N carries out the co-occurrence frequency analysis on the corresponding supplied document data. In addition, different word combinations are assigned to the calculation nodes N so that the calculation nodes N count the number of co-occurrences of the respective assigned word combinations. For example, one of the numbers 0 to 31 is assigned to each of the calculation nodes N without duplicates. For example, the calculation node N with the assigned number matching a value of a remainder obtained by dividing the hash value of the co-occurring word combination by 32 may be configured to count the number of the corresponding word combinations.

With the above information processing, each of the calculation nodes N performs communication for transmitting (reporting) a request for adding the number of occurrences of the co-occurring word combination with the calculation node N that counts the number of occurrence of the co-occurring word combination in response to detection of the co-occurring word combination. Such a communication destination may be highly random. This embodiment is suitable for the information processing in which the communications with the communication partner may exhibit high randomness. However, types of the information processing to which the embodiment is applied may not be limited to the above information processing. Any types of information processing may be employed insofar as the information processing is executed by the collaboration of the plural calculation nodes N (i.e., by allowing the plural calculation nodes N to mutually communicate with one another).

Note that in the information processing system 1, a group N of calculation nodes transmitting a result of information processing to another calculation node N and a group N of calculation nodes receiving a result of information processing from another calculation node N may be separately provided. Hereinafter, the group N of calculation nodes transmitting a result of information processing to another calculation node N is called "transmitting side nodes", and the group N of calculation nodes receiving a result of information processing from another calculation node N is called "receiving side nodes". Each of the calculation groups Ns may serve as both the transmitting side nodes and receiving side nodes.

A basic operation of the information processing system 1 is described below. In this embodiment, data called a transmission token may be sequentially transferred between the calculation nodes. For example, the transmission token may circulate (be distributed) in a virtual ring topology formed of the group N of the calculation nodes. The transmission token indicates data expressing a right to transmit data over the network (a transmission right). The transmission token is generated for each of the receiving side nodes. Hence, when there exist plural receiving side nodes, plural transmission tokens corresponding to the receiving side nodes circulate between the calculation nodes. That is, one transmission token represents a right to transmit data addressed to a calculation node N corresponding to the transmission token.

When a message (message transmitted to another calculation node N) is generated as a result of the information processing, the generated message is buffered (accumulated) until the transmission token corresponding to another calculation node N is received. The calculation node N that has received the transmission token transmits parts or all of the accumulated messages addressed to other calculation nodes N to the other calculation nodes N. Note that the message may be data including a result of the information processing or a processing request addressed to another node based on the result of the information processing.

Note that there may be a case in which latency (delay time) from generation of a message to transmission of the message may be restricted. In this case, if the calculation node N waits for receiving the transmission token that may be stored by another calculation node N, the aforementioned (delay time or latency) restriction may not be satisfied. Hence, such a calculation node N may be configured to transmit a request token in a direction opposite to the circulation direction (transferring direction) of the transmission token. The request token indicates data representing an acquisition request for acquiring a transmission right addressed to a specific calculation node N. Over the network, if the request token collides with (meets) the transmission token requested by the request token, a priority is given to the calculation node N that is the source of transmitting the request token.

The basic operation is described above. The transmission token and the request token are transferred in a further complicated manner based on a processing determination executed by the calculation nodes N, as described later.

Figure 2:
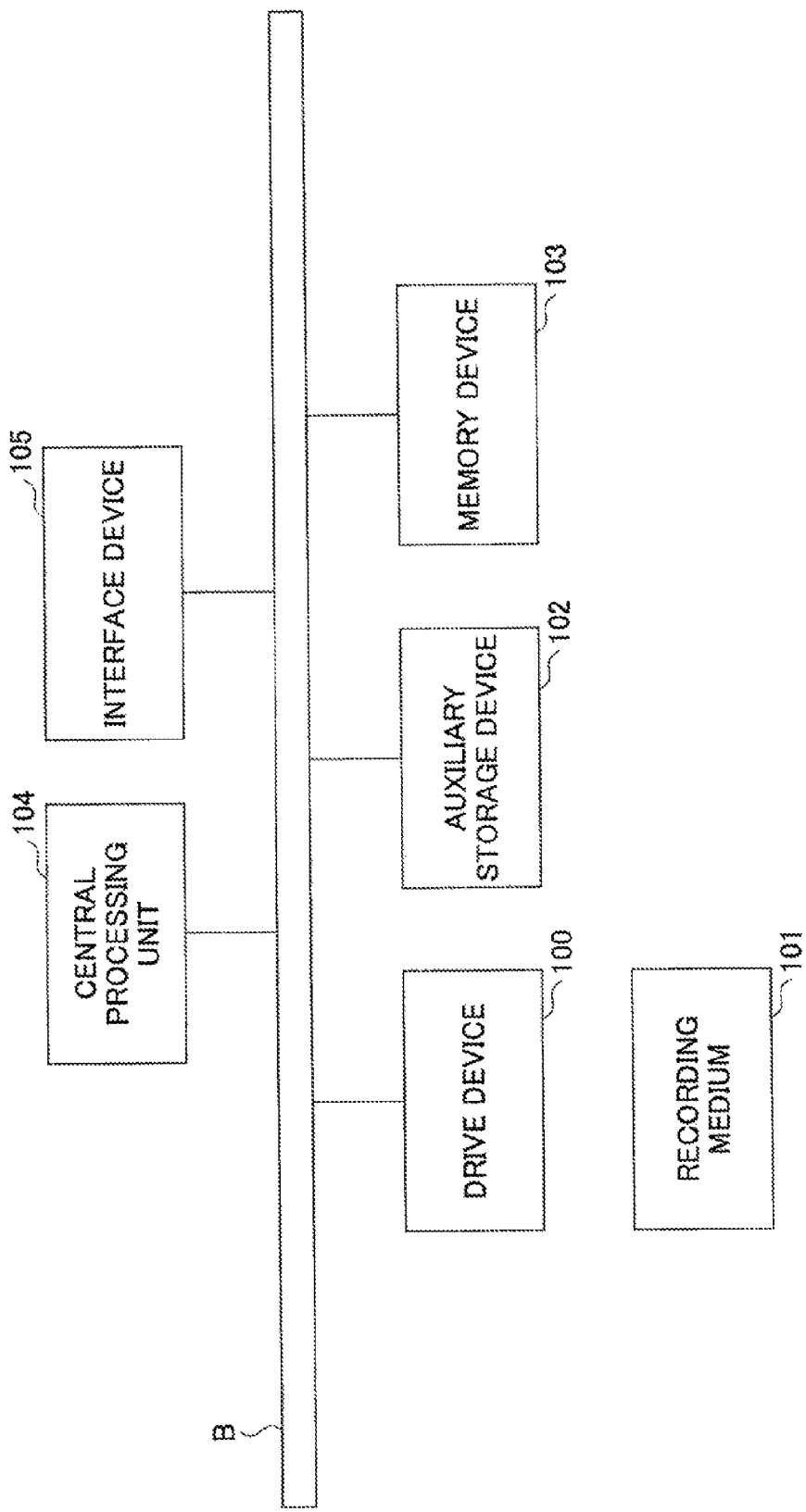
FIG. 2 is a diagram illustrating a hardware configuration example of a calculation node in the information processing system according to the embodiment.

FIG. 2 is a diagram illustrating a hardware configuration example of the calculation node N in the information processing system 1 according to the embodiment. As illustrated in FIG. 2, the calculation node N includes a drive device 100, an auxiliary storage device 102, a memory device 103, a CPU 104, and an interface device 105, which are mutually connected via a bus B.

A computer program (hereinafter simply called a "program") that implements processing in the calculation node N is provided with a non-transitory recording medium 101. When the recording medium 101 storing the program is set in the drive device 100, the program is installed from the recording medium 101 into the auxiliary storage device 102 via the drive device 100. Note that the program may not necessarily be installed from the recording medium 101, but may be installed by downloading it from other computers via the network. The auxiliary storage device 102 stores desired files, data and the like, as well as storing the installed program.

The memory device 103 retrieves, on receiving an instruction to activate the program, the program from the auxiliary storage device 102 and subsequently loads the retrieved program. The CPU 104 executes functions associated with the calculation node N based on the program loaded in the memory device 103. The interface device 105 is utilized as an interface for connecting the calculation node N to the network.

Note that examples of the recording medium 101 include transportable recording media such as a CD-ROM, a DVD disk and a USB memory. Further, examples of the auxiliary storage device 102 include a hard disk drive (HDD) and a flash memory. The recording medium 101 and the auxiliary storage device 102 may both correspond to a non-transitory computer-readable recording medium.

Figure 3:
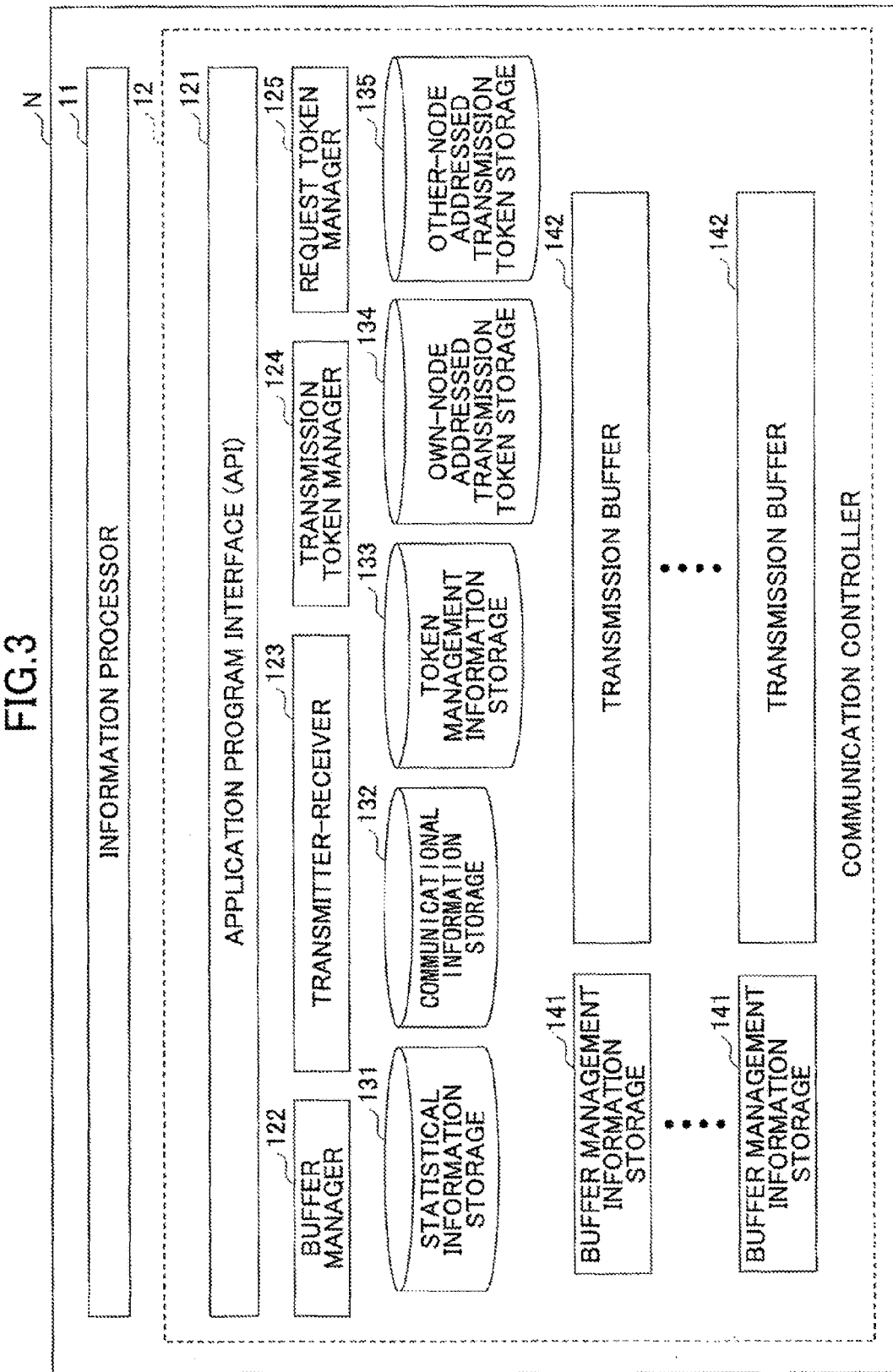
FIG. 3 is a diagram illustrating a functional configuration example of the calculation node in the information processing system according to the embodiment.

FIG. 3 is a diagram illustrating a functional configuration example of the calculation node N in this embodiment. As illustrated in FIG. 3, the calculation node N includes an information processor 11 and a communication controller 12.

A function of the information processor 11 may, for example, be implemented by causing the CPU 104 to execute an application program that performs information processing. The information processor 11 transmits a processing result to another calculation node N or receives (acquires) a processing result of the other calculation node N by utilizing the communication controller 12. Note that the information processor 11 utilizes the communication controller 12 via the application program interface (API) contained in the communication controller 12.

The communication controller 12 is configured to control communications associated with the information processing result obtained by the formation processor 11. As illustrated in FIG. 3, the communication controller 12 includes a buffer manager 122, a transmitter-receiver 123, a transmission token manager 124 and a request token manager 125. Functions of these components are implemented by causing the CPU 104 to execute the program installed in the calculation node N. The communication controller 12 further includes a statistical information storage 131, a communicational information storage 132, a token management information storage 133, an own-node addressed transmission token storage 134 and another-node addressed transmission token storage 135. These types of storage may be implemented by the auxiliary storage device 102 or the memory device 103. The communication controller 12 further includes a buffer management information storage 141 and a transmission buffer 142 for each of the other nodes that is a transmission destination of the message. These buffer management information storages 141 and the transmission buffers 142 may be implemented by the memory device 103.

The buffer manager 122 is configured to store a message in the transmission buffer 142 corresponding to the calculation node N of the transmission destination of the message in response to the transmission request of the message received from the information processor 11. The buffer manager 122 is further configured to update a stored content of the buffer management information storage 141 corresponding to the transmission buffer 142. The transmission buffer 142 is a storage region for accumulating (buffering) messages addressed to the corresponding calculation node N. The buffer management information storage 141 is configured to store identification information of the corresponding calculation node N or a usage status of the corresponding transmission buffer 142. Accordingly, the messages addressed to other nodes are stored in the corresponding transmission buffers 142 by being associated with the identification information of the corresponding nodes.

Note that a dedicated receiving side calculation node N may not necessarily include the buffer manager 122, the buffer management information storage 141 and the transmission buffer 142.

When the calculation node N (own-node) receives a transmission token addressed to another node, the transmitter-receiver 123 transmits parts or all of the messages stored (accumulated) in the transmission buffer 142 to the corresponding other node. The transmitter-receiver 123 also detects reception of the message that the other node has transmitted to itself (to the own node) and hands over the received message to the information processor 11.

When the calculation node N is the receiving side node, the transmission token manager 124 generates a transmission token issued by the own node (hereinafter called an "own-node addressed transmission token") and circulates (transfers) the generated transmission token among the calculation nodes N. When the calculation node N is the transmitting side node, the transmission token manager 124 requests the transmitter-receiver 123 to transmit a message addressed to another node when receiving a transmission token issued by the other node (hereinafter called "other-node addressed transmission token"). The request token manager 125 optionally generates (issues) a request token and circulates (transfers) the generated request token between the calculation nodes N. When the transmission token requested by the request token is stored in the own node, the request token manager 125 further records (stores) the request token corresponding to the transmission token in response to a reception of the request token.

The statistical information storage 131 is configured to store statistical information associated with communications controlled by the communication controller 12. The communicational information storage 132 is configured to store information to identify a transmission destination of the transmission token or the request token. The token management information storage 133 is configured to store information indicating a circulation status (a transferring status) of the transmission token addressed to the own node. The own-node addressed transmission token storage 134 is configured to store information indicating a circulation status (a transferring status) of the transmission token addressed to the own node. That is, the own-node addressed transmission token storage 134 serves as a queue of own-node addressed transmission tokens in a transmission standby mode. Note that the dedicated transmitting side calculation node N may not necessarily include the token management information storage 133 and the own-node addressed transmission token storage 134.

When the transmission token addressed to another node is received, the other-node addressed transmission token storage 135 temporarily stores the received transmission token.

Next, a procedure executed by the calculation node N in the information processing system 1 is described below. Note that in this embodiment, each of the calculation nodes N serves as a transmitting side node and a receiving side node, simultaneously.

Figure 4:
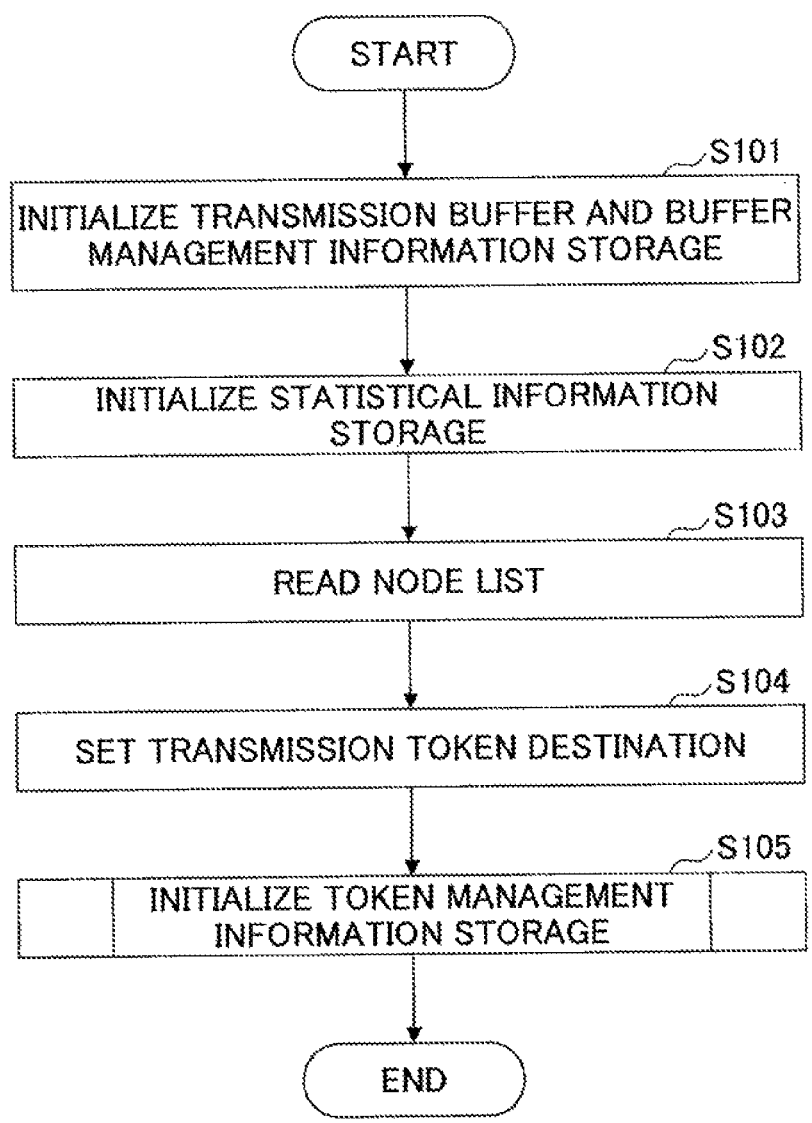
FIG. 4 is a flowchart illustrating an example of a procedure of initializing a communication controller.

FIG. 4 is a flowchart illustrating an example of a procedure of initializing the communication controller 12. The procedure illustrated in FIG. 4 may be executed when the communication controller 12 is activated.

In step S101, the buffer manager 122 initializes the transmission buffer 142 and the buffer management information storage 141 of each of the other nodes. For example, each of the transmission buffers 142 and a memory region of each of the buffer management information storages 141 are secured in the memory device 103, and an initial value is recorded in the buffer management information storage 141.

Figure 5:
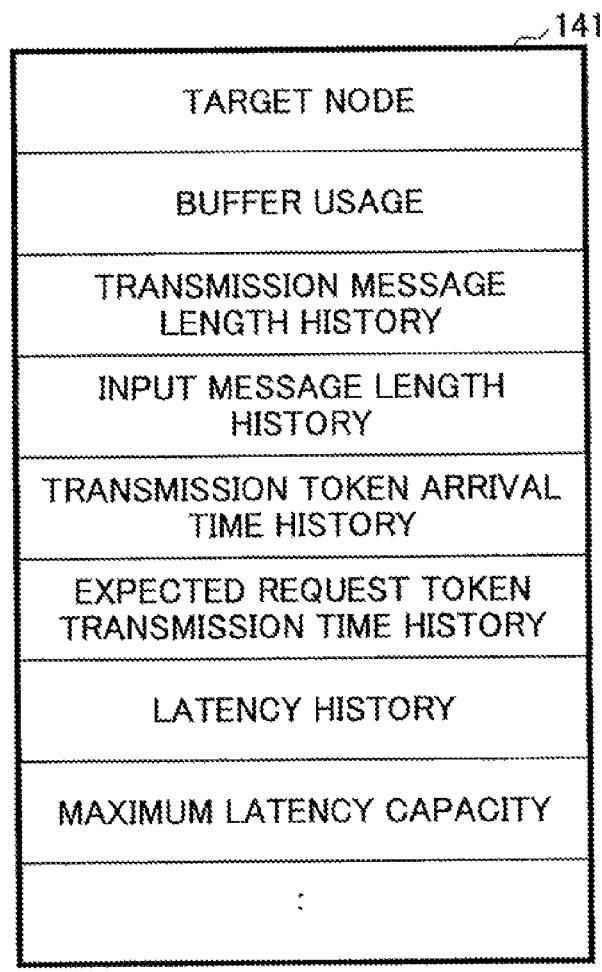
FIG. 5 is a diagram illustrating a configuration example of buffer management information storage.

FIG. 5 is a diagram illustrating a configuration example of the buffer management information storage 141. As illustrated in FIG. 5, the buffer management information storage 141 is configured to store a target node, a buffer usage, a transmission message length history, an input message length history, a transmission token arrival time history, an expected request token transmission time history, a latency history and a maximum allowable latency.

The target node indicates an identifier of the corresponding calculation node N (hereinafter simply called a "node identifier"). The buffer usage is usage of the corresponding transmission buffer 142. That is, the buffer usage is a total value of data sizes (i.e., message lengths) of the messages stored (accumulated) in the corresponding transmission buffer 142. The transmission message length history is a combined history of the message lengths of the messages transmitted in the past and respective transmission times of those transmitted messages. Hence, the message length transmitted per unit time (i.e., the transmission rate of the message (transmission throughput of the message)) may be obtained from the transmission message length history. The input message length history is a combined history of the message lengths of the messages input from the information processor 11 (i.e., transmission of the message is requested) and input times of those input messages (i.e., transmission requested times). Hence, the message length input per unit time (i.e., the input rate of the message (reception throughput of the message)) maybe obtained from the input message length history.

The transmission token arrival time history is a history of arrival times (received times) of the transmission tokens addressed to the other node corresponding to the buffer management information storage 141. Note that each of the calculation nodes Ns (each of the receiving side nodes) may generate plural own-node addressed transmission tokens. Accordingly, the transmission token arrival time history includes IDs of arrived transmission tokens and arrival times of the arrived transmission tokens for identifying the arrival time per the transmission token.

The expected request token transmission time history is a history of transmission times of the request tokens addressed to the other node corresponding to the buffer management information storage 141. The latency history is a history of latency from a time at which the request token is transmitted to the other node corresponding to the buffer management information storage 141 to a time at which the transmission token addressed to the other node is received. The maximum allowable latency corresponds to a maximum allowable value as latency (delay time) from a time at which the message is input (i.e., when the transmission request of the message is received) to a time at which the message is transmitted (output).

Note that in step S101, the target node records a node identifier of the calculation node N corresponding to the buffer management information storage 141. A value "0" is recorded in the buffer usage. A setting value stored in advance in the auxiliary storage device 102 is recorded in the maximum allowable latency. The setting value may be different for each of the calculation nodes N or may be the same for all the calculation nodes N. Further, contents of the transmission message length history, the input message length history, the transmission token arrival time history, the expected request token transmission time history and the latency history are blanked.

Subsequently, the transmitter-receiver 123 initializes the statistical information storage 131 (step S102). For example, a memory region of the statistical information storage 131 is secured in the memory device 103, and an initial value is recorded in the statistical information storage 131.

Figure 6:
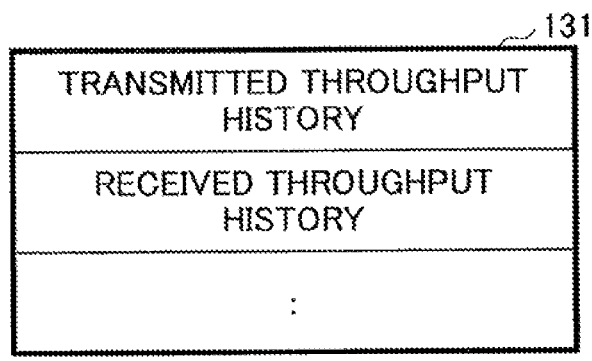
FIG. 6 is a diagram illustrating a configuration example of statistical information storage.

FIG. 6 is a diagram illustrating a configuration example of the statistical information storage 131. As illustrated in FIG. 6, the statistical information storage 131 is configured to store a transmission throughput history and a reception throughput history. The transmission throughput history is a combined history of transmission throughputs per certain period and delimiting times of the certain periods. In this embodiment, the certain period is delimited based on a timing at which the message is transmitted. Accordingly, the certain periods may not necessarily be constant. The reception throughput history is a combined history of reception throughputs per certain period and delimiting times of the certain periods. In this embodiment, the certain period is delimited based on a timing at which the message is received. Accordingly, the certain periods may not necessarily be constant. Note that there are no discriminations between transmission destinations in the transmission throughput history.

In step S102, the contents of the transmission throughput history and the reception throughput history are blanked.

Subsequently, the transmitter-receiver 123 may read node list information, for example, from the auxiliary storage device 12 and may record the read node list information in the communication information storage 132 (step S103).

Figure 7:
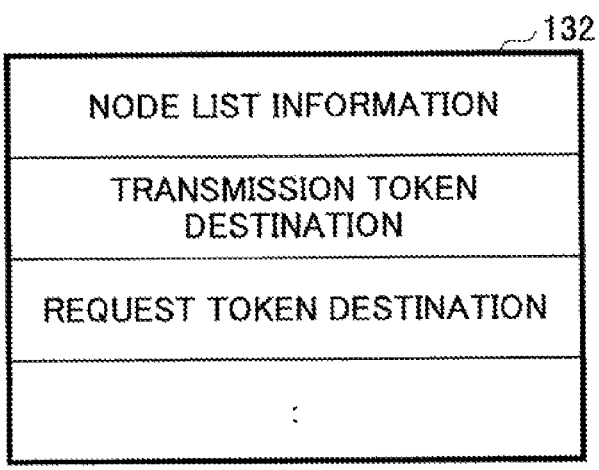
FIG. 7 is a diagram illustrating a configuration example of communicational information storage.

FIG. 7 is a diagram illustrating a configuration example of the communication information storage 132. As illustrated in FIG. 7, the communication information storage 132 includes respective items of node list information, a transmission token destination and a request token destination.

The node list information indicates a list of node identifiers of the calculation nodes N associated with the information processing system 1. In communications, if the calculation nodes N are identifiable by their IP addresses, the IP addresses may preferably be utilized as the node identifiers.

The node list information further indicates an order relation between the calculation nodes N associated with the circulation of the transmission token or the request token. For example, the node list information includes the node identifiers of the calculation nodes N in the aforementioned order relation between the calculation nodes N. The order relation represents an order relation in the aforementioned virtual ring topology.

The transmission destination of the transmission token may be the node identifier of the calculation node N as the transmission destination addressed from the own node (own calculation node N). The transmission destination of the transmission token may be the node identifier of the calculation node N that serves as the transmission destination addressed from the own node (own calculation node N).

Subsequently, the transmitter-receiver 123 sets respective values for a transmission token destination and a request token destination of the communication information storage 132 (step S104). For example, a node identifier of a calculation node N located subsequent to the own node (own calculation node N) in the order relation indicated by the node list information is set as the transmission token destination. Meanwhile, a node identifier of a calculation node N located prior to the own node (own calculation node N) in the order relation indicated by the node list information is set as the request token destination. In this case, transferring directions of the transmission token and the request token are mutually opposite directions.

Subsequently, the transmission token manager 124 executes initialization-processing (step S105).

Figure 8:
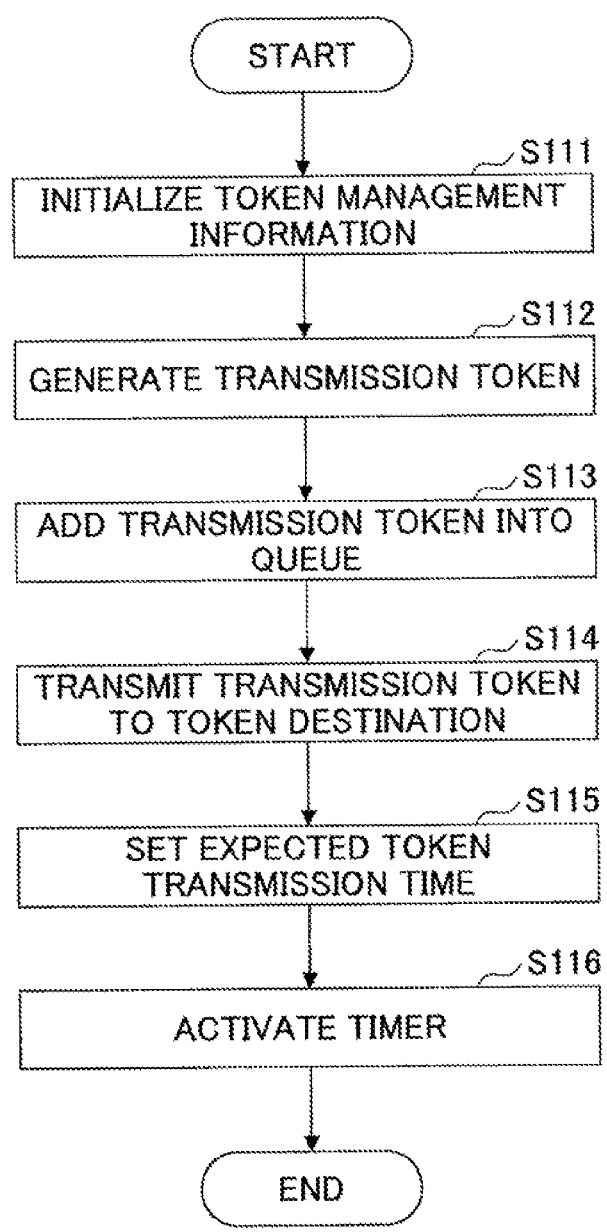
FIG. 8 is a flowchart illustrating an example of a procedure of initializing a transmission token manager.

Next, a detail of step S105 is described. FIG. 8 is a flowchart illustrating an example of a procedure of initialization processing performed by the transmission token manager 124. The dedicated transmitting side nodes N may not necessarily execute the processing illustrated in FIG. 8.

In step S111, the transmission token manager 124 initializes the token management information storage 133. For example, a memory region of the token management information storage 133 is secured in the memory device 103, and an initial value is recorded in the token management information storage 133.

Figure 9:
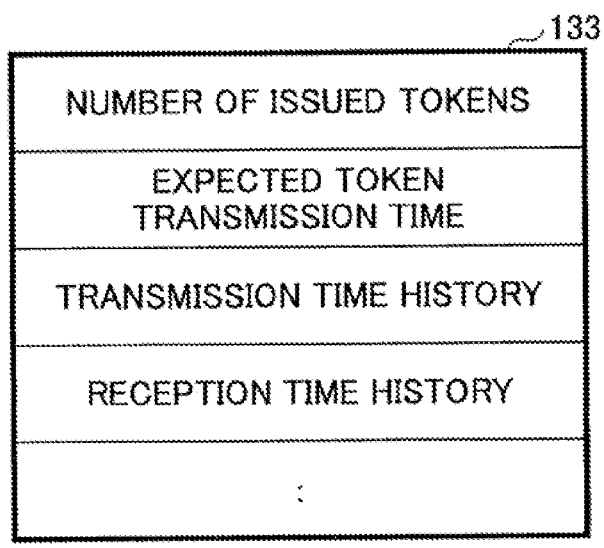
FIG. 9 is a diagram illustrating a configuration example of a token management information storage.

FIG. 9 is a diagram illustrating a configuration example of the token management information storage 133. As illustrated in FIG. 9, the token management information storage 133 includes respective items of a number of issued tokens, an expected token transmission time, a transmission time history and a reception time history.

The number of issued tokens indicates the number of currently issued transmission tokens addressed to the own node. As will be described later, the number of issued tokens addressed to the own node is adjusted according to the communication status. In the initialization processing, a value "0" is recorded in the number of issued tokens. The expected token transmission time indicates an expected transmission time at which a transmission token addressed to the own node is expected to be transmitted. The transmission time history is a combined history of transmission times of the transmission tokens received by the own node in the past and IDs of the transmission tokens. The reception time history is a combined history of reception times of the transmission tokens received by the own node in the past and IDs of the transmission tokens. For example, in the transmission time history and the reception time history, a time required for circulating the transmission token associated with the ID (one) in the virtual ring topology may be calculated based on the transmission time and the reception time having the associated ID.

Subsequently, the transmission token manager 124 generates one transmission token addressed to the own node (step S112). The transmission token manager 124 adds a value "1" corresponding to the number of issued tokens in the token management information storage 133 in response to the generation of the transmission token.

FIG. 10 is a diagram illustrating a configuration example of the transmission token. As illustrated in FIG. 10, the transmission token includes respective items of an ID, a target node, a maximum allowable transfer length, a total transfer amount, a required circulation time history, a request token list, a buffer shortage level per node, another-node addressed data amount per node and a maximum allowable latency shortage level per node.

The ID represents identifiers for identifying each of the transmission tokens. The target node represents a node identifier of the calculation node N determined as a transmission destination of the message determined based on a transmission right given by the transmission token. That is, the target node represents a node identifier of the calculation node N as a transmission token issuing source. The total transfer amount represents a total amount of messages transmitted based on the corresponding transmission tokens while circulating the transmission token once in the virtual ring topology. The required circulation time history represents a history of times required for the transmission token to circulate once in the virtual ring topology. The request token list is an item for storing the request token that desires to acquire the transmission token.

The buffer shortage level per node is a shortage level (degree) of the transmission buffer 142 corresponding to each of the calculation nodes N excluding the target node having the transmission right. The other-node addressed data amount per node is a total amount of usage of all the transmission buffers 142 of the other calculation nodes N excluding the target node having the transmission right. The maximum allowable latency shortage level per node is a shortage level (degree) of the maximum allowable latency associated with the messages accumulated in the transmission buffer 142 corresponding to the target node in each of the calculation nodes N excluding the target node having the transmission right. That is, the maximum allowable latency shortage level per node indicates a shortage level in a remaining time corresponding to the maximum allowable latency in each of the calculation nodes N.

Subsequently, the transmission token manager 124 stores (registers) the generated transmission token addressed to the own node in the own-node addressed transmission token storage 134 (step S113). The own-node addressed transmission token storage 134 may, for example, be configured to store the transmission token in a queue structure such as a first-in first-out (FIFO) structure.

Subsequently, the transmission token manager 124 acquires the oldest transmission token from the own-node addressed transmission token storage 134 and requests the transmitter-receiver 123 to transmit the oldest transmission token (step S114). Note that in this example, only one transmission token is stored in the own-node addressed transmission token storage 134, and hence, the transmission token manager 124 requests the transmitter-receiver 123 to transmit the transmission token registered in step S113. In response to such a request, the transmitter-receiver 123 transmits the transmission token associated with the request to the calculation node N associated with the node identifier set as the transmission token destination in the communicational information storage 132.

Subsequently, the transmission token manager 124 sets a value for the expected token transmission time of the token management information storage 133 (step S115). The expected token transmission time may, for example, be the current time or a time obtained by adding a predetermined time to the current time.

Subsequently, the transmission token manager 124 activates a timer function for reporting the expected token transmission time (step S116). The timer function is configured to monitor an elapsed time and transmit a notice of arrival of a specified time (i.e., the expected token transmission time) to the transmission token manager 124.

Figure 11:
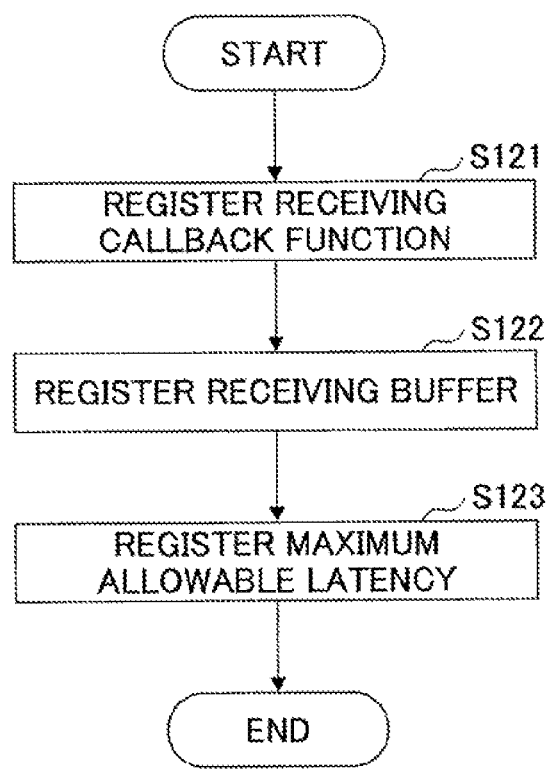
FIG. 11 is a flowchart illustrating an example of a procedure of initializing an information processor.

Subsequently, initialization processing performed on the information processor 11 is described. FIG. 11 is a flowchart illustrating an example of a procedure of initializing the information processor 11. The procedure illustrated in FIG. 4 may be executed when the information processor 11 is activated.

In step S121, the information processor 11 requests the communication controller 12 to register a receiving callback function via the API 121 (step S121). The transmitter-receiver 123 of the communication controller 12 stores an address of the receiving callback function specified in the request in the memory device 103. The receiving callback function is configured to be retrieved by the transmitter-receiver 123 when the own node detects the reception of a message from another node. Accordingly, the information processor 11 may be capable of detecting the reception of the message by the retrieval of the receiving callback function.

Subsequently, the information processor 11 requests the communication controller 12 to register a receiving buffer via the API 121 (step S122). The transmitter-receiver 123 of the communication controller 12 stores an address of the receiving buffer specified in the request in the memory device 103. The receiving buffer is a storage region utilized for transmitting the received message to the information processor 11.

Subsequently, the information processor 11 requests the communication controller 12 to register a maximum allowable latency via the API 121 (step S123). The buffer manager 122 of the communication controller 12 records a value of the maximum allowable latency specified in the request in the maximum allowable latency of the buffer management information storage 141. Note that when the information processor 11 specifies the maximum allowable latency upon requesting the transmission of the message, the execution of step S123 may be omitted.

After the termination of the initialization processing, the information processor 11 may execute information processing such as the co-occurrence frequency analysis based on input data stored in the auxiliary storage device 102. When the information processor 11 desires to transmit data (message) as a result of the information processing to another calculation node N, the information processor 11 requests the communication controller 12 to transmit such a message (data).

Next, a procedure executed by the communication controller 12 in response to the transmission request of the message from the information processor 11 is described.

Figure 12:
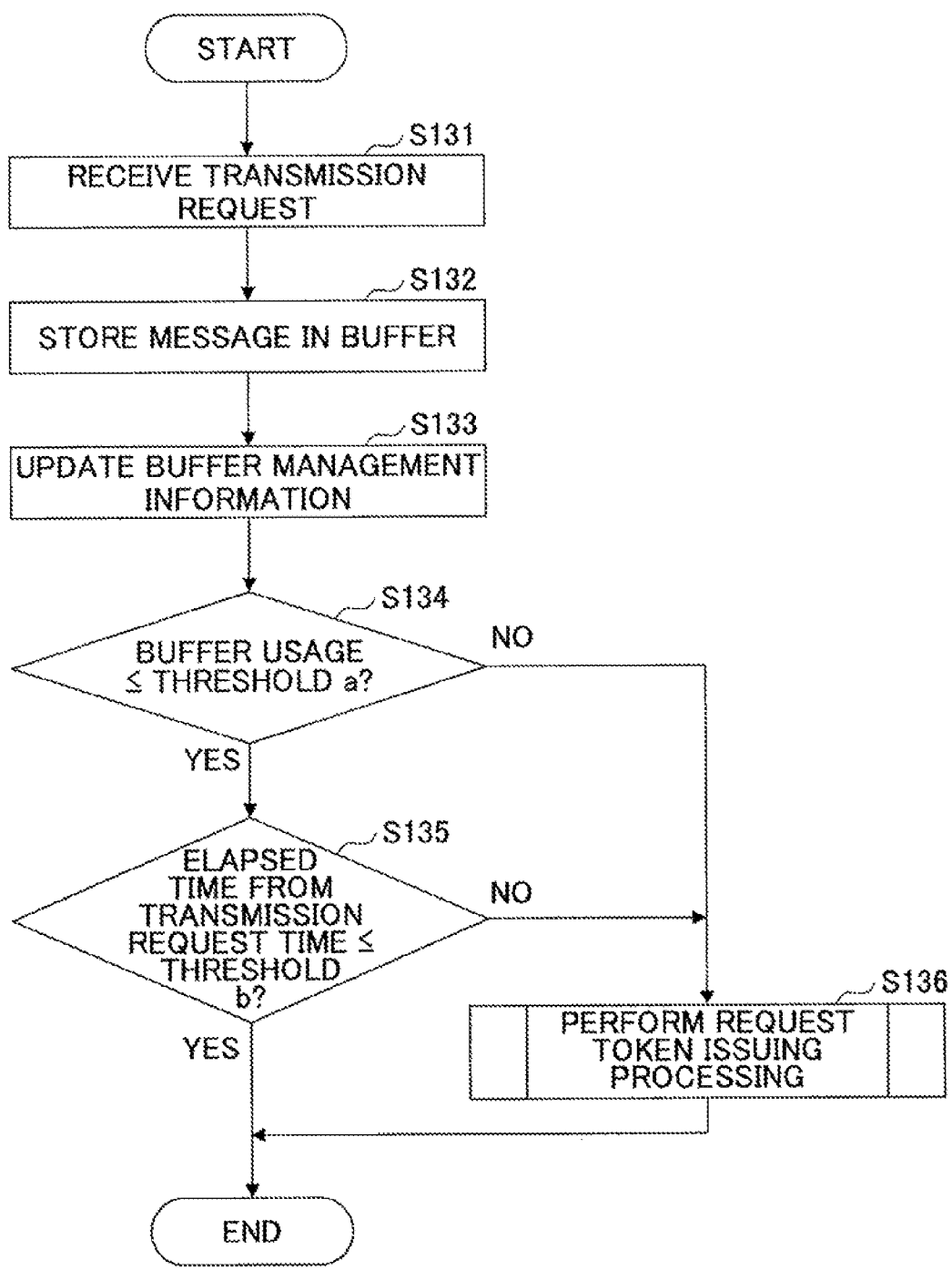
FIG. 12 is a flowchart illustrating an example of a procedure executed on receiving a transmission request of information processing data.

FIG. 12 is a flowchart illustrating an example of a procedure executed on receiving a transmission request of the message. The dedicated receiving side nodes N may not necessarily execute the processing illustrated in FIG. 12.

In step S131, the communication controller 12 receives the transmission request of the message from the information processor 11 via the API 121 (step S121). This transmission request specifies the message subject to transmission and the node identifier of the destination calculation node N (i.e., the transmission destination node). The transmission request may further specify the maximum allowable latency corresponding to the message.

Subsequently, the buffer manager 122 records (copies) the message specified by the transmission request in the transmission buffer 142 corresponding to the transmission node specified by the transmission request by associating the message with information indicating the current time (step S132). The current time is hereinafter called a "transmission request time". Note that when the maximum allowable latency is specified in the transmission request, the maximum allowable latency may also be recorded in the transmission buffer 142 by associating the maximum allowable latency with the message. Further, when another message is already stored in the transmission buffer 142, the message associated with the current transmission request is recorded subsequent to the other message stored in the transmission buffer 142. Accordingly, the transmission buffer 142 accumulates messages specified in one or more transmission requests.

Note that when the API 121 utilized for receiving the transmission request receives a pointer (i.e., an address) of a memory region that stores the message subject to transmission and a message length as respective parameters (arguments), the pointer and the message length may be stored in the transmission buffer 142. That is, in this case, the transmission buffer 142 may store not an entity of the message but information that specifies a memory region into which the information processor 11 has stored the message.

Subsequently, the buffer manager 122 updates a content of the buffer management information storage 141 corresponding to the transmission destination node. Specifically, the message length (i.e., data size) specified in the transmission request is added to the buffer usage. Further, a combination of the message length of the message and the current time is added to the input message length history.

Subsequently, the buffer manager 122 determines whether the buffer usage is equal to or less than a threshold a (step S134). The threshold a may, for example, be computed by the following equation (1).

$$\text{THRESHOLD } a = \text{BUFFER SIZE} \times \text{SAFETY COEFFICIENT} \quad (1)$$

The buffer size indicates a data size (the message length) capable of being stored in the transmission buffer 142 corresponding to the transmission destination node. The safety coefficient indicates a coefficient utilized for preventing the messages having the length (size) exceeding the buffer size from being recorded in the transmission buffer 142. That is, the safety coefficient is utilized for keeping the buffer usage within a predetermined amount. Hence, the safety coefficient may have a value greater than 0 and less than 1 (e.g., 0.6).

That is, in step S134, whether a shortage level of the transmission buffer 142 corresponding to the transmission destination node equals or exceeds a predetermined level is determined.

Alternatively, the threshold a may be computed by the following equation (2).

$$\text{THRESHOLD } a = \text{BUFFER SIZE} - \text{MEAN TRANSMISSION THROUGHPUT} \times \text{MEAN REQUIRED CIRCULATION TIME} \quad (2)$$

The mean transmission throughput is a mean value of the transmission throughput history of the statistical information storage 131 illustrated in FIG. 6. The mean required circulation time is a mean value of a time or duration required for circulating (one circulation) the transmission token corresponding to the transmission destination node in the virtual ring topology. The mean required circulation time may, for example, be computed based on the transmission token arrival time history of the buffer management information storage 141 (FIG. 5) corresponding to the transmission destination node. That is, each of interval times between the adjacent arrival times contained in the transmission token arrival time history is defined as a required circulation time for circulating a transmission token (once) in the virtual ring topology, and hence, the mean value is computed by averaging such internal times. Note that when the transmission token arrival time history includes arrival times of the plural transmission tokens, an interval time between the adjacent arrival times (circulation time) may be computed for each of the transmission tokens. Thereafter, a mean value may be computed by averaging all the circulation times regardless of the transmission tokens.

Further, the thresholds a computed by the equations (1) and (2) may be compared with the buffer usage. In this case, when the buffer usage exceeds any one of the thresholds a, the buffer usage may be determined as exceeding the threshold a.

Note that the equations (1) and (2) are only examples. When the shortage level of the transmission buffer 142 corresponding to the transmission destination node is identifiable, the threshold a may be computed by other equations.

When the buffer usage is equal to or less than the threshold a ("YES" in step S134), the buffer manager 122 determines whether an elapsed time from the transmission request time associated with the oldest message recorded in the transmission buffer 142 is equal to or less than a threshold b (step S135). The threshold b may, for example, be computed by the following equation (3)

$$\text{THRESHOLD } b = \text{MAXIMUM ALLOWABLE LATENCY} \times \text{SAFETY COEFFICIENT} \quad (3)$$

The maximum allowable latency may be a maximum allowable latency stored in the buffer management information storage 141 or a maximum allowable latency associated with the oldest message recorded in the buffer of the transmission destination node. The safety coefficient indicates a coefficient utilized for transmitting the message within the maximum allowable latency by taking into account of duration until the transmission token addressed to the transmission destination node is received.

That is, in step S135, a shortage level of the maximum allowable latency representing how close to a transmission time limit of the message corresponding to the transmission destination node it would be is determined.

Alternatively, the threshold b may be computed by the following equation (4).

$$\text{THRESHOLD } b = \text{MAXIMUM ALLOWABLE LATENCY} - \text{MEAN REQUIRED CIRCULATION TIME} \quad (4)$$

Each of the thresholds b computed by the equations (3) and (4) may be compared with the elapsed time from the transmission request time. In this case, when the elapsed time exceeds any one of the thresholds b, the elapsed time may be determined as exceeding the threshold b.

Note that the equations (3) and (4) are only examples. When the shortage level of the maximum allowable latency representing how close to a transmission time limit of the message corresponding to the transmission destination node it would be is identifiable, the threshold b may be computed by other equations.

When the above elapsed time is equal to or less than the threshold b ("YES" in step S135), the processing illustrated in FIG. 12 may be terminated. On the other hand, when the buffer usage exceeds the threshold a ("NO" in step S134), or when the above elapsed time exceeds the threshold b ("NO" in step S135), the buffer manager 122 specifies the node identifier of the transmission destination node and requests the request token manager 125 to issue the request token. In response to the request, the request token manager 125 executes issuing processing of the request token (step S136). As described above, the request token may be issued when free space of the transmission buffer 142 is in shortage, or when the transmission time limit of the message is close to the due.

Figure 13:
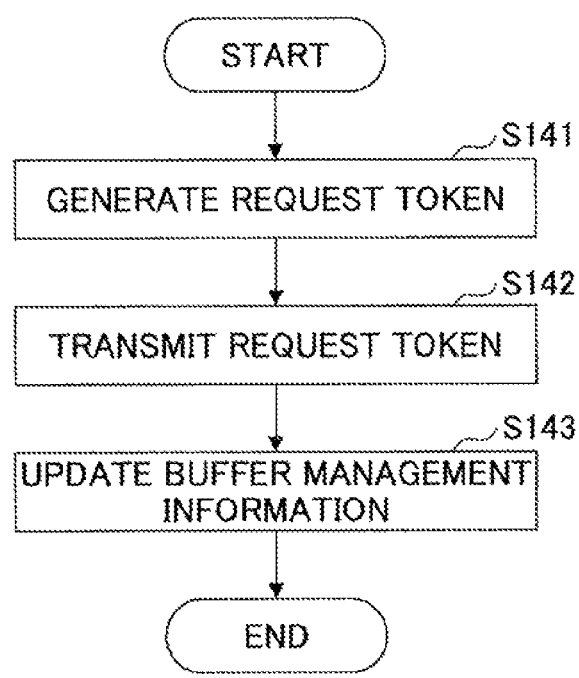
FIG. 13 is a flowchart illustrating an example of a procedure of issuing a request token.

Next, a detail of step S136 is described. FIG. 13 is a flowchart illustrating an example of a procedure of issuing a request token. The dedicated receiving side nodes N may not necessarily execute the processing illustrated in FIG. 13.

In step S141, the request token manager 125 generates a request token.

Figure 14:
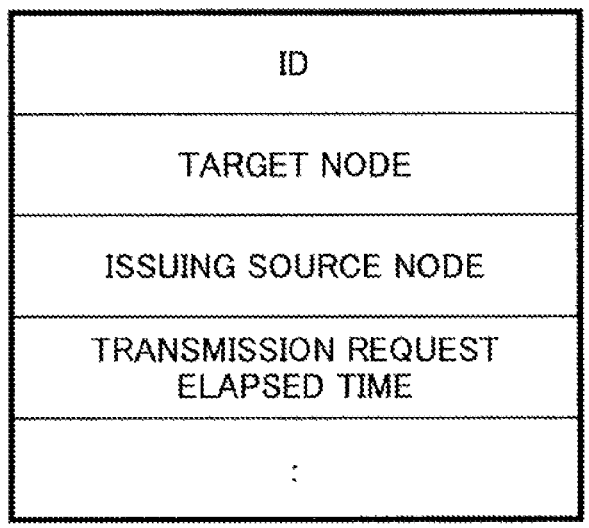
FIG. 14 is a diagram illustrating a configuration example of a request token.

FIG. 14 is a diagram illustrating a configuration example of the request token. As illustrated in FIG. 14, the request token includes respective items of an ID, a target node, an issuing source node and a transmission request elapsed time.

The ID indicates an identifier for identifying the associated transmission token. The target node indicates a node identifier of the calculation node N determined as a transmission destination of the transmission token intended to be acquired by the request token. The issuing source node indicates a node identifier of the calculation node N as a request token issuing source (i.e., a request token generating source). The transmission request elapsed time indicates an elapsed time from the transmission request time of the oldest message in the transmission buffer 142 corresponding to the target node.

The target node generated in step S141 records the node identifier of the transmission destination node specified in a request token issuing request from the buffer manager 122. The target node also records the node identifier of the own node as a transmission source node. Further, the transmission request elapsed time records an elapsed time from the transmission request time of the oldest message in the transmission buffer 142 corresponding to the transmission destination node specified in the request token issuing request from the buffer manager 122.

Subsequently, the request token manager 125 requests the transmitter-receiver 123 to transmit the generated request token. The transmitter-receiver 123 transmits the request token to the calculation node N associated with the node identifier set as a request token destination in the communicational information storage 132 (step S142). Subsequently, the request token manager 125 updates a content of the buffer management information storage 141 (FIG. 5) corresponding to the target node of the request token (step S143). Specifically, a request token transmission history records a combination of an ID of the transmitted token and the current time.

Figure 15:
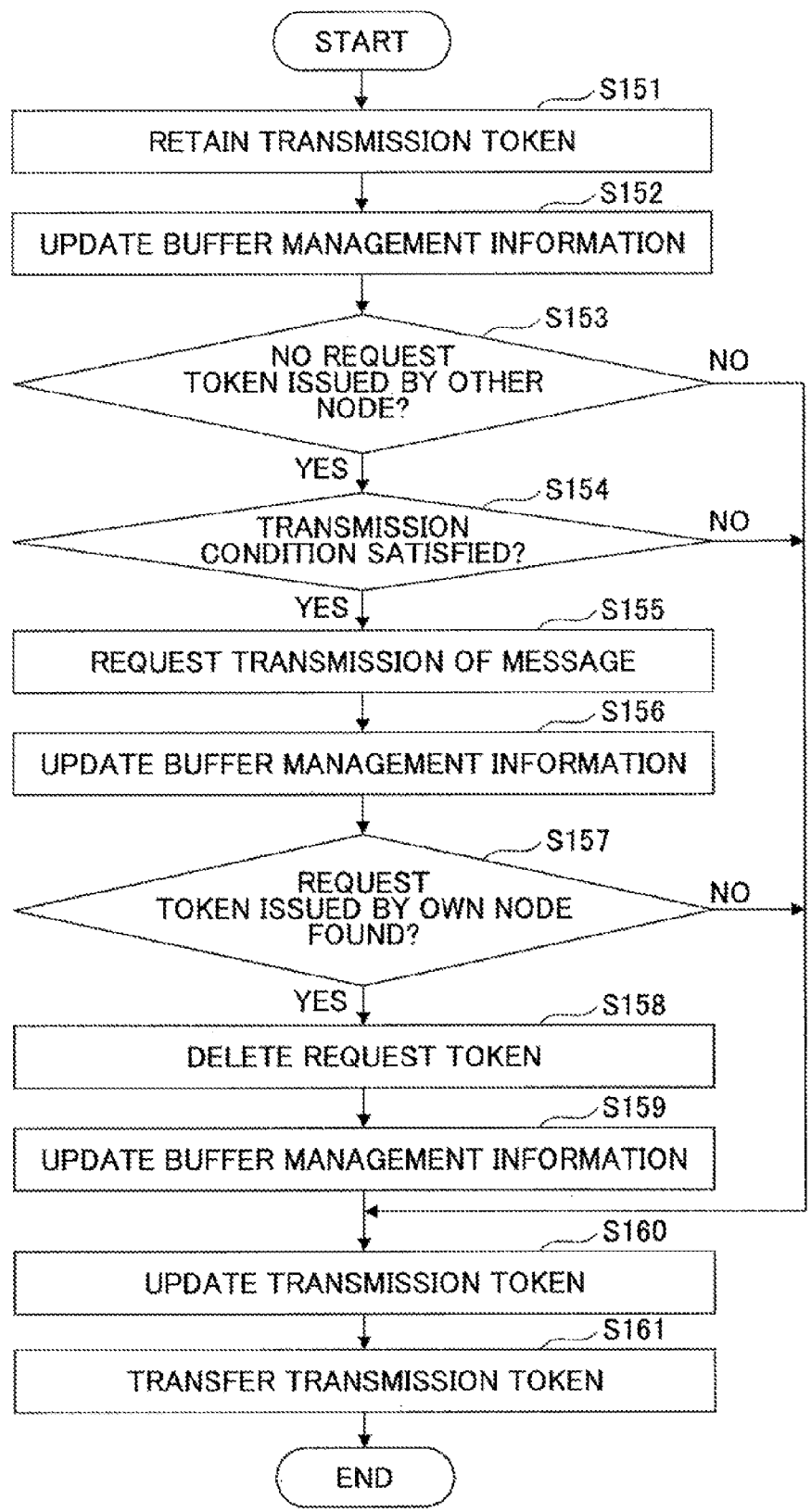
FIG. 15 is a flowchart illustrating an example of a procedure executed in response to reception of another-node addressed token.

Next, a procedure executed when the transmission token addressed to another node is received is described. FIG. 15 is a flowchart illustrating an example of a procedure executed in response to reception of the other-node addressed token. The dedicated receiving side nodes N may not necessarily execute steps S151 to S160 illustrated in FIG. 15.

Subsequently, when the other-node addressed transmission token is received, the transmission token manager 124 stores the received other-node addressed transmission token in the other-node addressed transmission token storage 135 (step S151). That is, the other-node addressed transmission token is temporarily retained in the own node.

Subsequently, the transmission token manager 124 updates a recorded content of the buffer management information storage 141 (FIG. 5) corresponding to the other node (may also be called a "transmission destination node") (step S152).

That is, the current time is added to the transmission token arrival time history of the buffer management information storage 141.

Subsequently, the transmission token manager 124 determines whether the request token list of the received transmission token includes a request token issued by the calculation nodes (other nodes) other than the own node (step S153). That is, the transmission token manager 124 determines whether there is any other node that urgently requires transmission of a message to the transmission destination node. Note that whether the request token is issued by the other node or the own node may be identifiable by referring to the issuing source node within the request token (FIG. 14).

When no request token issued by the other node is found in the request token list corresponding to the transmission tokens ("YES" in step S153), the transmission token manager 124 determines whether a transmission condition is satisfied by referring to the buffer management information storage 141 corresponding to the transmission destination node (step S154). The transmission condition indicates a condition that allows the transmission of a message stored in the transmission buffer 142 corresponding to the transmission destination node.

In this embodiment, the transmission condition includes first to fourth conditions. The first and the second conditions represent an active condition, and the third and the fourth conditions represent a passive condition. The active condition is satisfied when anyone of the first and second conditions is satisfied. The passive condition is satisfied when the first and second conditions are both satisfied. The transmission condition is eventually satisfied when the active condition and the passive condition are both satisfied. Note that the transmission condition may alternatively be satisfied when any one of the active condition and the passive condition is satisfied. In addition, the active condition may include any one of the first and second conditions. Likewise, the passive condition may include any one of the third and fourth conditions.

Specific contents of the first to the fourth conditions are as follows.

First condition: the buffer usage corresponding to the transmission destination node exceeds a minimum buffering amount per node.

Second condition: time (duration) computed by the maximum allowable latency×the safety coefficient has elapsed with respect to the forefront message.

Third condition: there is no other node having the buffer shortage level higher than that of the own node with respect to the transmission buffer 142 corresponding to the transmission destination node.

Fourth condition: there is no other node having the maximum allowable latency shortage level higher than that of the own node with respect to the message addressed to the transmission destination node.

The first condition indicates the transmission buffer 142 accumulating an amount of messages that exceeds a predetermined amount of the messages (the minimum buffering amount per node). The message length per transmission may be increased by allowing the transmission of the message when the first condition is satisfied. Note that the minimum buffering amount per node is a lowest value of the accumulated amount of the messages that is set in advance corresponding to each of the other nodes in the own node (e.g., stored in the auxiliary storage device 102). The minimum buffering amount per node may be a common value that is shared by all the other nodes.

The second condition is set for transmitting the message within the maximum allowable latency. A forefront message indicates the oldest message accumulated in the transmission buffer 142. The maximum allowable latency may employ a value per message when the maximum allowable latency is specified per message. Otherwise, the maximum allowable latency may employ a value corresponding to the maximum allowable latency of the buffer management information storage 141. Note that the safety coefficient is utilized for not allowing a message transmission time to exceed the maximum allowable latency. Accordingly, the safety coefficient may have a value greater than 0 and less than 1 (e.g., 0.6).

The third condition is set for preventing a remaining amount of the transmission buffer 142 in the other node from being depleted by giving a priority to the other node to transmit the message addressed to the transmission destination node when there is another node having a shortage level of the transmission buffer 142 higher than that of the own node. The buffer shortage level of the own node may, for example, be computed by dividing the current buffer usage of the transmission buffer 142 corresponding to the transmission destination buffer 142 by a size of the transmission buffer 142. The buffer shortage level of the other node may be acquired from the buffer shortage level per node in the transmission token. Note that when the transmission buffers 142 of all the transmitting side nodes have the same size, a common value is applied to a denominator in the equation used for computation of the buffer shortage level. Hence, the buffer usages may simply be compared in this case. That is, the third condition may be replaced with a condition in which "there is no other node having the buffer usage greater than that of the own node with respect to the transmission buffer 142 corresponding to the transmission destination node".

The fourth condition is set for preventing occurrence of delay in transmission of the message addressed to the transmission destination node by giving a priority to the other node to transmit the message addressed to the transmission destination node when there is another node having a shortage level of the maximum allowable latency higher than that of the own node. The shortage level of the maximum allowable latency of the own node may, for example, be computed by dividing an elapsed time from an input time of inputting the forefront message to the current time by the maximum allowable latency. The buffer shortage level of the other node may be acquired from the maximum allowable latency shortage level per node in the transmission token. Note that when the transmission buffers 142 of all the transmitting side nodes have the same maximum allowable latency, a common value is applied to a denominator in the equation used for computation of the maximum allowable latency shortage level. Hence, the elapsed times may simply be compared in this case. That is, the fourth condition may be replaced with a condition in which "there is no other node having the elapsed time longer than that of the own node with respect to the message addressed to the transmission destination node".

Subsequently, the transmission token manager 124 requests the transmitter-receiver 123 to transmit the message stored in the transmission buffer 142 corresponding to the transmission destination addressed message to the transmission destination node (step S155). The message length of the message to be transmitted may be determined as a smaller one of the buffer usage of the transmission buffer 142 and the maximum allowable transfer length of the transmission token. That is, the message length of the message to be transmitted may be limited within a range of the maximum transfer length allowed by the transmission destination node. Such a limitation is set for avoiding the congestion in communications corresponding to the transmission destination node. Thus, messages having the message length falling within the message length range from the forefront message may be specified in the request addressed to the transmitter-receiver 123 in the transmission buffer 142. The transmitter-receiver 123 transmits a specified message to the transmission destination node. The transmitter-receiver 123 updates a transmission throughput history in the statistical information storage 131 in response to the transmission of the message. Specifically, the transmission throughput from the transmission time of the previous message to the transmission time of the current message may be computed by dividing the message length of the currently transmitted message by a difference between a time recorded at the end of the transmission throughput history and a current time. A combination of the computed transmission throughput and the current time is added to the transmission throughput history.

Subsequently, the transmission token manager 124 updates a content of the buffer management information storage 141 corresponding to the transmission destination node (step S156). Specifically, the message length of the message transmitted in step S155 is subtracted from the buffer usage of the buffer management information storage 141. Further, a combination of the message length and the current time is added to the transmission message length history.

Subsequently, the transmission token manager 124 determines whether the request token list of the received transmission token includes a request token issued by the own node (step S157). When the request token list of the received transmission token includes the request token ("YES" in step S157), the transmission token manager 124 executes steps S158 and S159.

In step S158, the transmission token manager 124 deletes the request token issued by the own node from the request token list corresponding to the transmission tokens. The request token issued by the own node is deleted from the request token list corresponding to the transmission tokens because the request token is no more necessary due to the successful transmission of the message in step S155. Subsequently, the transmission token manager 124 updates a stored content of the buffer management information storage 141 corresponding to the transmission destination node (step S159). Specifically, the elapsed time from the transmission time of the request token to the reception time of the transmission token is added to the latency history of the buffer management information storage 141. The transmission time of the request token corresponds to a time recorded at the end of the expected request token transmission time history in the buffer management information storage 141.

When "NO" is selected in step S159, S153, S154 or S157, the transmission token manager 124 updates a content of the received transmission token (FIG. 10) (step S160). Specifically, the transmission token manager 124 updates the own-node buffer shortage level, the other-node addressed data amount, and the maximum allowable latency shortage level in the buffer shortage level per node, the other-node addressed data amount per node, and the maximum allowable latency shortage level per node of the transmission token. The computational methods of the buffer shortage level and the maximum allowable latency shortage level are already described above. The other-node addressed data amount corresponds to a total amount of the buffer usages of all the transmission buffers 142 in the own node. Further, when the transmission of the message is executed (step S155), the message length of the transmitted message is added to a total transfer amount of the transmission tokens.

Subsequently, the transmission token manager 124 requests the transmitter-receiver 123 to transfer the transmission token (step S161). At this moment, the transmission token is deleted from the other-node addressed transmission token storage 135. In response to such a request, the transmitter-receiver 123 transmits the transmission token associated with the request to the calculation node N associated with the node identifier set as the transmission token destination in the communicational information storage 132.

Note that when a request token issued by the other node is found in the request token list corresponding to the transmission tokens, the transmission token manager 124 may request the transmitter-receiver 123 to transmit (transfer) the transmission token by specifying the node identifier of the issuing source node of the request token in step S161. In this case, the transmitter-receiver 123 transmits the transmission token to the calculation node N associated with the specified node identifier. Specifically, the transmission token will not circulate in the virtual ring topology but be directly transferred to the issuing source node. As a result, it may be possible to quicken the arrival time of the transmission token at the issuing source node.

Figure 16:
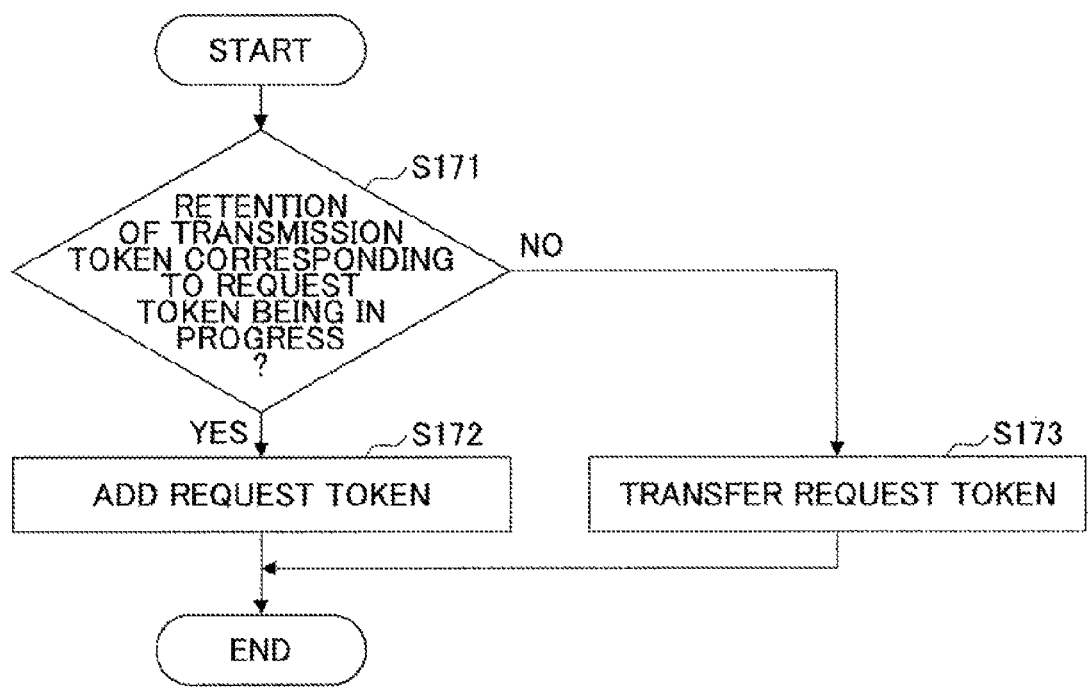
FIG. 16 is a flowchart illustrating an example of a procedure executed when the request token is received.

Next, a procedure executed when the transmission token issued by another node serving as issuing source node is received is described. FIG. 16 is a flowchart illustrating an example of a procedure executed when the request token is received.

When the request token issued by the other node serving as an issuing source node is received, the request token manager 125 determines whether the transmission token corresponding to the request token is retained (step S1171). That is, the request token manager 125 determines whether the transmission token having a target node that matches a target node of the request token (FIG. 14) is stored in the other-node addressed transmission token storage 135.

When such a transmission token is stored in the other-node addressed transmission token storage 135 ("YES" in step S171), the request token manager 125 adds (records) the request token to the request token list corresponding to the transmission tokens (step S125). In this case, the request token is transferred while being attached to the transmission token in step S161 illustrated in FIG. 15. Note that when one or more other request tokens are already contained in the request token list corresponding to the transmission tokens, the request token manager 125 may sort the request token list in the order sorted based on the order relationship when the own node is located at a forefront of the nodes in the virtual ring topology.

On the other hand, when the corresponding transmission token is not stored in the other-node addressed transmission token storage 135 ("NO" in step S171), the request token manager 125 requests the transmitter-receiver 123 to transfer the request token (step S173). In response to such a request, the transmitter-receiver 123 transmits the request token to the calculation node N associated with the node identifier set as the transmission token destination in the communicational information storage 132.

Accordingly, when the request token meets the transmission token addressed to the target node in a certain node, the request token is stored in the transmission token.

Figure 17:
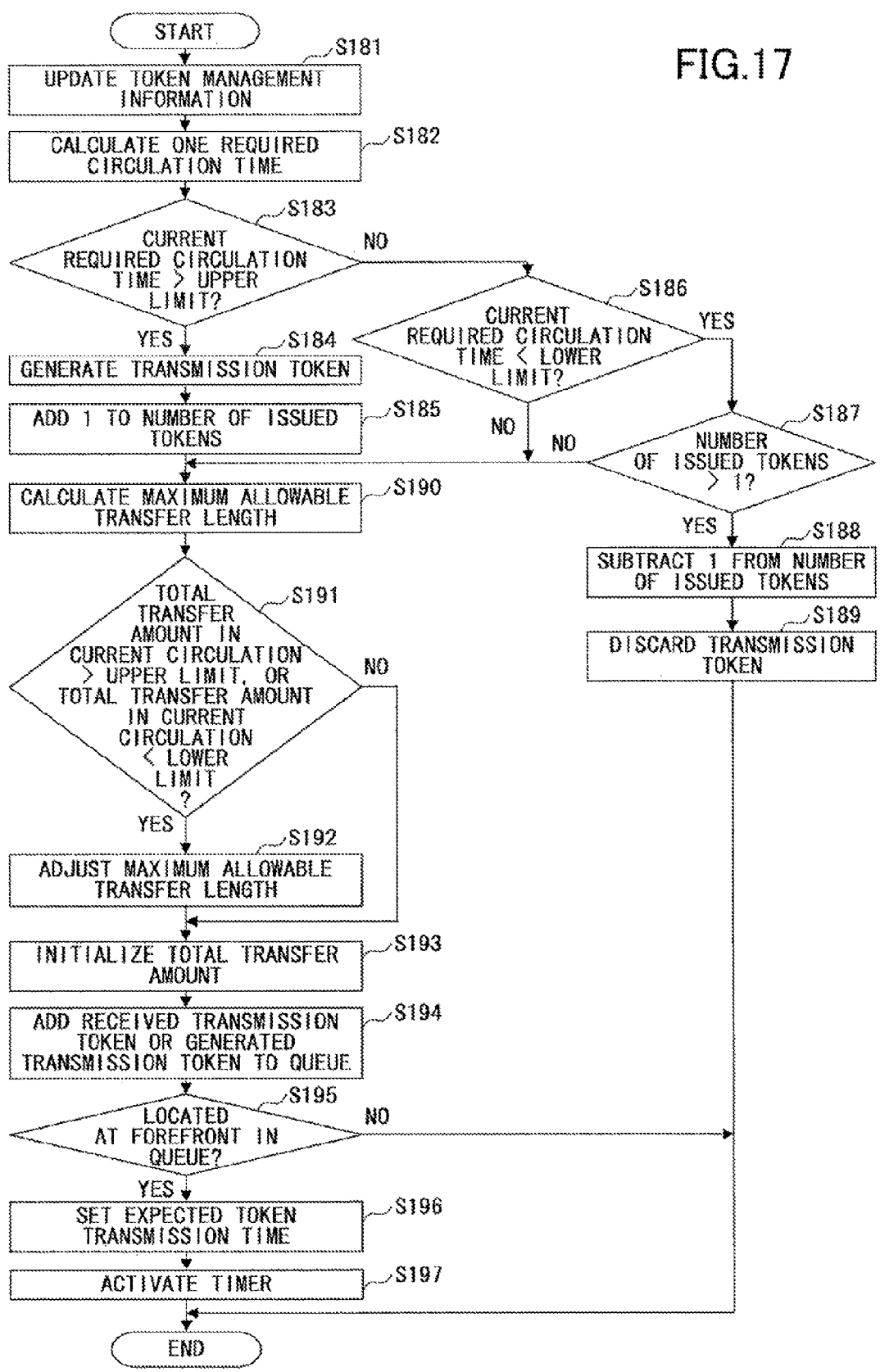
FIG. 17 is a flowchart illustrating an example of a procedure executed in response to reception of an own-node addressed transmission token.

Next, a procedure executed when the transmission token addressed to the own node is received is described. FIG. 17 is a flowchart illustrating an example of a procedure executed in response to reception of the own-node addressed token. The dedicated transmitting side nodes N may not execute the processing illustrated in FIG. 17.

When the own-node addressed transmission token is received, the transmission token manager 124 updates a stored content of the token management information storage 133 (step S181). Specifically, a combination of an ID of the transmission token and the current time (i.e., the reception time of the transmission token) is added to the reception time history.

Subsequently, the transmission token manager 124 computes a time required for the transmission token to circulate once in the virtual ring topology (i.e., required circulation time) (step S182). The required circulation time is computed by subtracting the last transmission time associated with an ID of the transmission token recorded in the transmission time history of the token management information storage 133 from the last reception time associated with an ID of the transmission token recorded in the reception time history. Note that the computed required circulation time is added to the required circulation time history of the transmission token.

Subsequently, the transmission token manager 124 determines whether a current required circulation time exceeds a predetermined upper limit of the required circulation time set in advance (step S183). When the current required circulation time exceeds the upper limit ("YES" in step S183), the transmission token manager 124 generates a new transmission token addressed to the own node (step S184). Initial values of the items contained in the newly generated transmission token are already described in step S112 above. Note that an ID of the newly generated transmission token differs from the ID of the received transmission token. Subsequently, the transmission token manager 124 adds 1 to the number of issued transmission tokens of the token management information storage 133 (step S185). This is because the number of issued own-node addressed transmission tokens is increased (by 1) due to the newly generated transmission token.

Note that the reason that the number of the own-node addressed transmission tokens is increased when the required circulation time exceeds the upper limit of the required circulation time is to decrease the latency (delay) associated with the message addressed to the own node. That is, the fact that the required circulation time exceeds the upper limit of the required circulation time indicates that there is a large number of other nodes that transmit the messages addressed to the own nodes. The more the other nodes that transmit the messages to the own nodes, the more often the own-node addressed transmission tokens may be retained by the other nodes. As a result, a circulation rate of the transmission token maybe reduced. In such a condition, the waiting time until the other nodes desired to transmit the messages addressed to the own nodes actually transmit the corresponding messages may be increased. That is, the latency relating to the transmission of the message becomes large. Hence, such waiting time may be desirably reduced by increasing the number of the own-node addressed transmission tokens. For example, when the own-node addressed transmission token is increased from 1 to 2, and an interval between the two transmission tokens corresponds to half the distance of the virtual ring topology, the waiting time until the own-node addressed message is transmitted may theoretically be halved.

On the other hand, when the current required circulation time is equal to or less than the upper limit ("NO" in step S183), the transmission token manager 124 determines whether the current required circulation time is less than a predetermined lower limit of the required circulation time set in advance (step S186). When the current required circulation time is less than the lower limit ("YES" in step S186), the transmission token manager 124 determines whether the number of issued transmission tokens in the token management information storage exceeds 1 (step S187). That is, the transmission token manager 124 determines whether two or more own-node addressed transmission tokens are generated.

When the number of issued transmission tokens exceeds 1 ("YES" in step S187), the transmission token manager 124 subtracts 1 from the current number of issued transmission tokens (step S188). Subsequently, the transmission token manager 124 discards the received transmission token (step S189) and terminates the processing illustrated in FIG. 17. As a result, the transferring of the transmission token is terminated.

That is, the fact that the current required circulation time is less than the lower limit indicates that there are an excessive number of the own-node addressed transmission tokens corresponding to the number of the other nodes desired to transmit the messages addressed to the own nodes. Hence, the number of the own-node addressed transmission tokens may be desirably reduced back to an appropriate value by reducing the number of the own-node addressed transmission tokens.

Note that the upper limit and the lower limit may be computed by multiplying a maximum reference value and a minimum reference value set in advance per calculation node N by a total number of the calculation nodes N in the information processing system 1. In this case, the maximum reference value per calculation node N may be computed, for example, by "the maximum allowable latency×the safety coefficient". The minimum reference value per calculation node N may be computed, for example, by "the maximum reference value× the safety coefficient". Alternatively, the upper limit and the lower limit may be computed based on mutually different methods.

When "NO" is selected in step S186 or S187, the transmission token manager 124 computes the maximum allowable transfer length per own-node addressed transmission token (step S190). Specifically, the transmission token manager 124 computes the maximum allowable transfer length such that "the number of issued transmission tokens×the maximum allowable transfer length" has a constant value. That is, the transmission token manager 124 computes the maximum allowable transfer length per own-node addressed transmission token by the following computation.

MAXIMUM ALLOWABLE TRANSFER LENGTH PER OWN-NODE ADDRESSED TRANSMISSION TOKEN=PREDETERMINED VALUE÷NUMBER OF ISSUED TRANSMISSION TOKENS

The predetermined value indicates a value set as the maximum allowable transfer length of the transmission token when the first own-node addressed transmission token is generated. The generated value is set as the maximum allowable transfer length (FIG. 10) of the own-node addressed transmission token. Further, when the new transmission token is generated in step S184, the generated value is set as the maximum allowable transfer length of the newly generated transmission token.

Note that when "NO" is selected in step S186, the number of issued own-node addressed transmission tokens will not be increased or decreased in response to the reception of the current transmission token. In this case, the maximum allowable transfer length is also computed. This is because the number of issued transmission tokens may have already been increased or decreased when another own-node addressed transmission token is received prior to reception of the current transmission token. That is, it may be difficult to update the maximum allowable lengths of all the own-node addressed transmission tokens simultaneously since there are chronological differences between the arrival times of the own-node addressed transmission tokens. Hence, the maximum allowable transfer length is set for the own-node addressed transmission token every time the own-node addressed transmission token is received.

Note that when the received transmission token is discarded in step S189, there is no transmission token for which the maximum allowable transfer length is subject to being set. Accordingly, it may not be necessary to compute the maximum allowable transfer length. Hence, the maximum allowable transfer length will be changed based on the decrease in the number of issued transmission tokens due to the discarding of the transmission token when step S190 is executed for the subsequently received own-node addressed transmission token.

Accordingly, it may be possible to prevent congestion in the communication corresponding to the won node or an increase in the latency of the communication corresponding to the own node by adjusting the maximum allowable transfer length of each of the transmission tokens in response to the increase or decrease in the number of issued own-node addressed tokens. That is, if the maximum allowable transfer length of each of the transmission tokens has not been changed and remains unchanged in response to the increase in the number of issued transmission tokens, the amount of own-node addressed messages may exceed the capacity (allowable range) of the corresponding own node. Further, if the maximum allowable transfer length of each of the transmission tokens has not been changed and remains unchanged in response to the decrease in the number of issued transmission tokens, the other nodes may transmit only a small amount of the messages comparative to the capacity (allowable range) of the corresponding own node. As a result, the latency of the communications may be increased. However, according to the embodiment, the maximum allowable transfer length of each of the transmission tokens may be adjusted in response to the increase or the decrease in the number of own-node addressed transmission tokens. Hence, it may be highly possible to suppress the above described adverse effect of the increase in the latency of the communications.

Subsequently, the transmission token manager 124 determines whether a total transfer amount (FIG. 10) in the current circulation (one circulation) recorded in the received transmission token exceeds an upper limit or is less than a lower limit of the total transfer amount (step S191). The upper limit and the lower limit of the total transfer amount represent respective thresholds differing from those of the required circulation time.

When the total transfer amount recorded in the received transmission token exceeds the upper limit or is less than the lower limit ("YES" in step S191), the transmission token manager 124 adjusts the maximum allowable transfer length of the transmission token (step S192). More specifically, when the total transfer amount exceeds the upper limit, the maximum allowable transfer length may be shortened. On the other hand, when the total transfer amount is less than the upper limit, the maximum allowable transfer length may be elongated. These steps are prepared as countermeasures for preventing congestion in the communications or the increase in the communication latency corresponding to the own node.

Note that the upper limit and the lower limit of the total transfer amount may, for example, be set in advance. Alternatively, the maximum reference value and the minimum reference value of the communication throughput per calculation node N may be set in advance, and the upper limit and the lower limit may be obtained by computing "MAXIMUM REFERENCE VALUE OR MINIMUM REFERENCE VALUE×REQUIRED CIRCULATION TIME÷NUMBER OF ISSUED OWN-NODE ADDRESSED TRANSMISSION TOKENS".

Subsequently, the transmission token manager 124 initializes the total transfer amount of the received transmission tokens to "0" (step S193). The total transfer amount indicates the total transfer amount of the transmission tokens received in one circulation. Subsequently, the transmission token manager 124 stores the received transmission token in the own-node addressed transmission token storage 134 (step S194). Further, when the new transmission token is generated in step S184, the newly generated transmission token is also stored in the own-node addressed transmission token storage 134.

When the transmission token stored in the own-node addressed transmission token storage 134 in step S194 is located at the forefront of the queue structure of the own-node addressed transmission token storage 134 ("YES" in step S195), the transmission token manager 124 sets a value for the expected token transmission time of the token management information storage 133 (FIG. 9) (step S196). The expected token transmission time may, for example, be a time obtained by adding a predetermined time to the last transmission time in the transmission time history of the token management information storage 133. The predetermined time may be set in advance, or may be computed by "SETTING VALUE OF REQUIRED TIME PER CALCULATION NODE N×NUMBER OF CALCULATION NODES N÷NUMBER OF ISSUED OWN-NODE ADDRESSED TRANSMISSION TOKENS". Alternatively, the predetermined time may be computed by "REQUIRED CIRCULATION TIME÷NUMBER OF ISSUED OWN-NODE ADDRESSED TRANSMISSION TOKENS".

Subsequently, the transmission token manager 124 activates a timer function for reporting the expected token transmission time (step S197).

Figure 18:
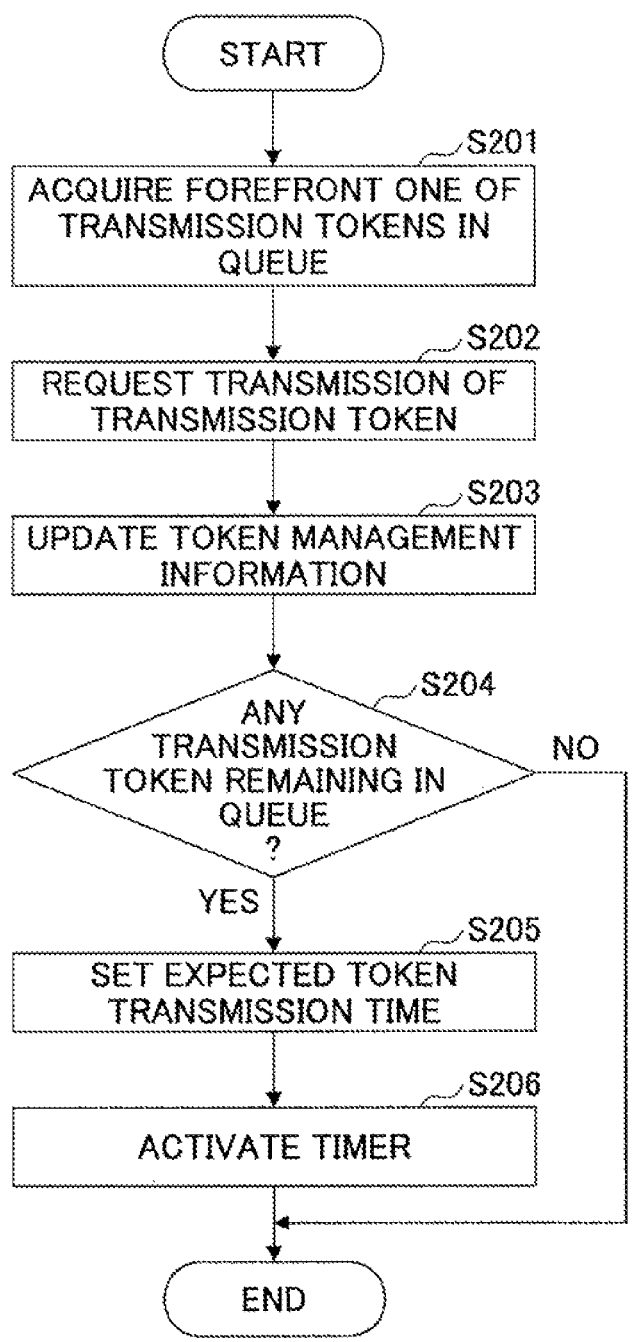
FIG. 18 is a flowchart illustrating an example of a procedure executed in response to the arrival of an expected token transmission time.

Next, a procedure executed when the transmission token manager 124 is informed of the arrival of the expected token transmission time by the activation of the timer function illustrated, for example, in steps in S197 of FIG. 17 or step S206 of FIG. 18.

FIG. 18 is a flowchart illustrating an example of a procedure executed in response to the arrival of the expected token transmission time. The dedicated transmitting side nodes N may not execute the processing illustrated in FIG. 18.

In response to the arrival of the expected token transmission time reported by the timer function, the transmission token manager 124 acquires one transmission token stored at the forefront of the queue of the own-node addressed transmission token storage 134 (step S201). Note that the acquired transmission token is deleted from the own-node addressed transmission token storage 134.

Subsequently, the transmission token manager 124 requests the transmitter-receiver 123 to transfer the acquired transmission token (step S202). The transmitter-receiver 123 transmits the transmission token associated with the request to the calculation node N associated with the node identifier set as the transmission token destination in the communicational information storage 132.

Note that when a request token issued by the other node is contained in the request token list corresponding to the transmission tokens, the transmission token manager 124 may request the transmitter-receiver 123 to transmit (transfer) the transmission token by specifying the node identifier of the issuing source node of the request token in step S202. In this case, the transmitter-receiver 123 transmits the transmission token to the calculation node N associated with the specified node identifier. Specifically, the transmission token will not circulate in the virtual ring topology but directly be transferred to the issuing source node. As a result, it may be possible to quicken the arrival time of the transmission token to the issuing source node.

Subsequently, the transmission token manager 124 adds a combination of a token identifier of the transmitted transmission token and the current time (i.e., transmission time) to the transmission time history of the token management information storage 133 (step S203). Subsequently, the transmission token manager 124 checks whether a transmission token waiting for being transmitted is stored in the own-node addressed transmission token storage 134 (step S204). When the transmission token is stored in the own-node addressed transmission token storage 134, (step S204), the transmission token manager 124 sets a value for the expected token transmission time of the token management information storage 133 (FIG. 9) (step S205). The value to be set for the expected token transmission time may be determined in a same manner as illustrated in step S196 of FIG. 17. Subsequently, the transmission token manager 124 activates a timer function for reporting the expected token transmission time (step S206).

Next, a procedure executed when the message addressed to the own node transmitted from another node is received is described.

Figure 19:
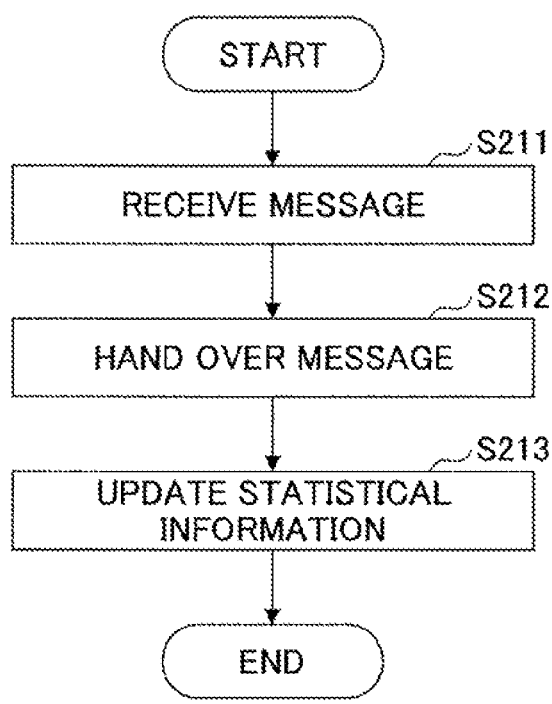
FIG. 19 is a flowchart illustrating an example of a procedure executed in response to transmission of a message from another node.

FIG. 19 is a flowchart illustrating an example of a procedure executed in response to transmission of the message from the other node. Note that the transmission of the message from the other node may correspond to processing executed in step S155 of FIG. 15. The dedicated transmitting side nodes N may not execute the processing illustrated in FIG. 19.

In step S211, reception of the message addressed to the own node transmitted from the other node is detected. The reception of the message may, for example, be detected by retrieving a reception function of the transmitter-receiver 123 triggered by a signal or the like from the operating system (OS).

Subsequently, the transmitter-receiver 123 hands over the received message to the information processor 11 (step S212). Specifically, the transmitter-receiver 123 records the received message in the receiving buffer registered in step S122 of FIG. 11 and retrieves the receiving callback function registered in step S121. In response to the retrieval of the receiving callback function, the information processor 11 may be capable of detecting the reception of the message and acquiring the message from the receiving buffer.

Subsequently, the transmitter-receiver 123 updates the reception throughput history of the statistical information storage 131 (step S131). Specifically, the reception throughput from the reception time of the previous message to the reception time of the current message may be computed by dividing the message length of the currently received message by a difference between a time recorded at the end of the reception throughput history and a current time. A combination of the computed reception throughput and the current time is added to the reception throughput history.

As described above, according to this embodiment, the message may be buffered until the transmission token is received. As a result, a transmission amount of simultaneously transmitting messages may be increased to improve the throughput. Further, the congestion of the messages in parts of the calculation nodes N may be prevented by limiting the calculation nodes N that are allowed to transmit the messages to those retaining the transmission tokens. As a result, a communication time of each of the calculation nodes N may be approximately in proportion to a total amount of communication. Accordingly, if the total amount of communication is the same between the calculation nodes N, the variability of the communication times may be reduced. Accordingly, the communication time of the overall information processing system 1 may be reduced. Further, each of the calculation nodes N may take in account statuses of other calculation nodes N to determine whether to transmit the message from the own node. As a result, the network unitization rate in the information processing system 1 may be improved and the throughput in the information processing system 1 may also be improved.

Note that the embodiment pertains specifically to communications performed by parallel distributed processing computers, is suitable for a system having a relaxed condition in the latency requirement in which a communication partner may be determined based on the processing result, where scheduling with the communication partner may not be determined in advance, and uniformly random communications may be obtained. Further, the embodiment is also suitable for a system in which the transmission buffer 142 has a relatively small size compared to the total amount of the messages subject to processing.

Further, in the embodiment, an example in which the transmission tokens and the request tokens circulate in the virtual ring topology is described. However, other types of topologies may be employed as a distributional channel of the transmission tokens and the request tokens. For example, a virtual binary tree topology may be employed as the distribution channel. For example, in the virtual binary tree topology, each of the calculation nodes N includes information indicating a relationship between the own node and two child nodes in a binary tree forming all the calculation nodes N that transmit the messages to the other nodes. In this topology, each of the transmission tokens may be transferred in a direction from a root node of the binary tree to leaf nodes, and when the transmission token reaches the leaf nodes, the transmission token is sent back in a direction toward the root node. The request token is transferred in a direction opposite to the direction in which the transmission token is transferred. That is, the request token may be transferred in a direction from the leaf nodes to the root node.

Note that in this embodiment, the transmitting side node is an example of a first information processing apparatus. The receiving side node is an example of a second information processing apparatus. However, the transmitting side node and receiving side node may be combined into one calculation node N. Further, the transmission buffer 142 is an example of data storage. The transmission token is an example of a first token. The request token is an example of a second token. The transmitter-receiver 123 is an example of a transmitter.

According to the embodiment, the congestion in the communications may be reduced.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiments of the present invention have been described in detail, it should be understood that the various changes, substitutions, and alterations could be made hereto without departing from the spirit and scope of the invention.

What is claimed is:

1. A communication method in an information processing system including a plurality of information processing apparatuses, the communication method comprising:
storing data, by a first information processing apparatus of the plurality of information processing apparatuses, in a data storage in association with identifier information of a second information processing apparatus of the plurality of information processing apparatuses to which the data is to be transmitted;
receiving, by the first information processing apparatus, a first token generated by the second information processing apparatus, the first token indicating a transmission right to transmit the data to the second information processing apparatus and being transferred among the plurality of information processing apparatuses;
recording in the received first token, by the first information processing apparatus, one of first information relating to an amount of the data stored in association with the identifier information of the second information processing apparatus in the data storage and second information relating to an amount of time elapsed after the data is stored in the data storage;
determining, by the first information processing apparatus, whether to transmit the data stored in the data storage by comparing one of the first information and the second information recorded in the first token by the first information processing apparatus, with a corresponding one of first information and second information recorded in the first token by another first information processing apparatus of the plurality of information processing apparatuses; and
transmitting the data, by the first information processing apparatus, to the second information processing apparatus when it is determined to transmit the data,
wherein the first token includes information indicating a maximum allowable transmission amount; and
wherein in the transmitting, the first information processing apparatus transmits the data within the maximum allowable transmission amount.

2. The communication method as claimed in claim 1, wherein the first information processing apparatus transmits the data to the second information processing apparatus when an amount of the data stored in the data storage in association with the identifier information of the second information processing apparatus exceeds a predetermined amount, or when a predetermined time elapses after the data is stored in the data storage.

3. The communication method as claimed in claim 1, wherein when an amount of time taken to transfer the first token among the plurality of information processing apparatuses exceeds a first predetermined value, the second information processing apparatus newly generates another first token and transfers the newly generated first token among the plurality of information processing apparatuses.

4. The communication method as claimed in claim 3, wherein when the amount of time taken to transfer the first token among the plurality of information processing apparatuses is less than a second predetermined value, the second information processing apparatus terminates the transferring of the first token.

5. The communication method as claimed in claim 3, further comprising:
changing, by the second information processing apparatus, the maximum allowable transmission amount based on a number of the first tokens generated by the second information processing apparatus; and
recording, by the second information processing apparatus, the changed maximum allowable transmission amount in each of the first tokens.

6. The communication method as claimed in claim 1, further comprising:
changing, by the second information processing apparatus, the maximum allowable transmission amount based on an amount of transmitted data transmitted to the second information processing apparatus using the first token; and
recording, by the second information processing apparatus, the changed maximum allowable transmission amount in the first token.

7. A communication method in an information processing system including a plurality of information processing apparatuses, the communication method comprising:
storing data, by a first information processing apparatus of the plurality of information processing apparatuses, in a data storage in association with identifier information of a second information processing apparatus of the plurality of information processing apparatuses to which the data is to be transmitted;
receiving, by the first information processing apparatus, a first token generated by the second information processing apparatus, the first token indicating a transmission right to transmit the data to the second information processing apparatus and being transferred among the plurality of information processing apparatuses;
generating, by the first information processing apparatus, a second token including the identifier information of the second information processing apparatus when one of an amount of the data stored in the data storage and an amount of time elapsed after the data is stored in the data storage exceeds a predetermined value; and
transferring, by the first information processing apparatus, the generated second token among the plurality of information processing apparatuses, wherein
when the first information processing apparatus receives a second token generated by another first information processing apparatus of the plurality of information processing apparatuses and the first information processing apparatus retains the first token generated by the second information processing apparatus corresponding to the identifier information in the received second token, the first information processing apparatus records the received second token in the first token;
when the received first token does not include the second token generated by the other first information processing apparatus, the first information processing apparatus transmits the data to the second information processing apparatus in response to reception of the first token; and
when the received first token includes the second token generated by the other first information processing apparatus, the first information processing apparatus does not transmit the data using the first token,
wherein the first token includes information indicating a maximum allowable transmission amount; and
wherein in the transmitting, the first information processing apparatus transmits the data within the maximum allowable transmission amount.

8. An information processing system, comprising:
a plurality of information processing apparatuses each of which serves as a first information processing apparatus and a second information processing apparatus,
wherein each first information processing apparatus includes:

a data storage configured to store data in association with identifier information of each second information processing apparatus, a receiver configured to receive a first token generated by the second information processing apparatus, the first token indicating a transmission right to transmit the data to the second information processing apparatus and being transferred among the plurality of information processing apparatuses, and a transmitter configured to transmit the data to the second information processing apparatus in response to reception of the first token; and wherein the first token includes information indicating a maximum allowable transmission amount, and the transmitter transmits the data within the maximum allowable transmission amount, wherein the first information processing apparatus includes a recording part configured to record, in the received first token, one of first information relating to an amount of the data stored in association with the identifier information of the second information processing apparatus in the data storage and second information relating to an amount of time elapsed after the data is stored in the data storage; and wherein the recording part determines whether to transmit the data stored in the data storage by comparing one of the first information and the second information recorded in the first token by the recording part, with a corresponding one of first information and second information recorded in the first token by another first information processing apparatus of the plurality of information processing apparatuses.

9. The information processing system as claimed in claim 8, wherein the transmitter transmits the data to the second information processing apparatus when an amount of the data stored in association with the identifier information of the second information processing apparatus exceeds a predetermined amount, or when a predetermined time elapses after the data is stored in the data storage.

10. The information processing system as claimed in claim 8, wherein the second information processing apparatus includes a generator configured to generate the first token; and when an amount of time taken to transfer the first token among the plurality of information processing apparatuses exceeds a first predetermined value, the generator newly generates another first token and transfers the newly generated first token among the plurality of information processing apparatuses.

11. The information processing system as claimed in claim 10, wherein when the amount of time taken to transfer the first token among the plurality of information processing apparatuses is less than a second predetermined value, the generator terminates the transferring of the first token.

12. The information processing system as claimed in claim 10, wherein the generator changes the maximum allowable transmission amount based on a number of the first tokens generated by the second information processing apparatus and records the changed maximum allowable transmission amount in each of the first tokens.

13. The information processing system as claimed in claim 8, wherein the second information processing apparatus includes a generator configured to generate the first token; and the generator changes the maximum allowable transmission amount based on an amount of transmitted data transmitted to the second information processing apparatus using the first token, and records the changed maximum allowable transmission amount in the first token.

14. An information processing system, comprising:

a plurality of information processing apparatuses each of which serves as a first information processing apparatus and a second information processing apparatus, wherein each first information processing apparatus includes:

a data storage configured to store data in association with identifier information of each second information processing apparatus, a receiver configured to receive a first token generated by the second information processing apparatus, the first token indicating a transmission right to transmit the data to the second information processing apparatus and being transferred among the plurality of information processing apparatuses, and a transmitter configured to transmit the data to the second information processing apparatus in response to reception of the first token; and wherein the first token includes information indicating a maximum allowable transmission amount, and the transmitter transmits the data within the maximum allowable transmission amount, wherein the first information processing apparatus includes a second generator configured to generate a second token including the identifier information of the second information processing apparatus when one of an amount of the data stored in the data storage and an amount of time elapsed after the data is stored in the data storage exceeds a predetermined value, and transfer the generated second token among the plurality of information processing apparatuses;

wherein when the receiver receives a second token generated by another first information processing apparatus of the plurality of information processing apparatuses and the first information processing apparatus retains the first token generated by the second information processing apparatus corresponding to the identifier information in the received second token, the second generator records the received second token in the first token; and wherein when the received first token includes the second token generated by the other first information processing apparatus, the transmitter does not transmit the data using the first token.

* * * * *